United States Patent
Han et al.

(10) Patent No.: US 11,184,633 B2
(45) Date of Patent: Nov. 23, 2021

(54) SIMPLIFICATION OF HISTORY-BASED MOTION VECTOR PREDICTION

(71) Applicant: QUALCOMM Incorporated, San Diego, CA (US)

(72) Inventors: Yu Han, San Diego, CA (US); Wei-Jung Chien, San Diego, CA (US); Han Huang, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/696,008

(22) Filed: Nov. 26, 2019

(65) Prior Publication Data

US 2020/0169745 A1    May 28, 2020

Related U.S. Application Data

(60) Provisional application No. 62/771,981, filed on Nov. 27, 2018.

(51) Int. Cl.
*H04N 19/00* (2014.01)
*H04N 19/52* (2014.01)
(Continued)

(52) U.S. Cl.
CPC ........... *H04N 19/52* (2014.11); *H04N 19/105* (2014.11); *H04N 19/139* (2014.11);
(Continued)

(58) Field of Classification Search
CPC ................................................... H04N 19/00
See application file for complete search history.

(56) References Cited

U.S. PATENT DOCUMENTS

2016/0366415 A1    12/2016 Liu et al.
2020/0099951 A1*    3/2020 Hung ................. H04N 19/55

FOREIGN PATENT DOCUMENTS

WO    2020003275 A1    1/2020

OTHER PUBLICATIONS

Zhao J., et al., "CE4-related: Simplification to History Based Motion Vector Prediction", 12, JVET Meeting, Oct. 3, 2018-Oct. 12, 2018, Macao, (The Joint Video Exploration Team of ISO/IEC JTC1/SC29/WG11 and ITU-T SG.16), No. JVET-.0309, Oct. 3, 2018 (Oct. 3, 2018), 5 pages, XP030194485, (Year: 2018).*
(Continued)

*Primary Examiner* — Maryam A Nasri
(74) *Attorney, Agent, or Firm* — QUALCOMM Incorporated

(57) ABSTRACT

A method of coding video data, including constructing a history-based motion vector prediction (HMVP) candidate history table that includes motion vector information of previously coded blocks that extend beyond adjacent neighboring blocks of a current block, constructing a motion vector predictor list, and adding one or more HMVP candidates from the HMVP candidate history table to the motion vector predictor list. Adding the one or more HMVP candidates from the HMVP candidate history table comprises comparing a first HMVP candidate in the HMVP candidate history table to two entries in the motion vector predictor list and no other entries, and adding the first HMVP candidate to the motion vector predictor list when the first HMVP candidate is different than both of the two entries in the motion vector predictor list. The method also includes coding the current block of video data using the motion vector predictor list.

19 Claims, 8 Drawing Sheets

(51) Int. Cl.
| | |
|---|---|
| *H04N 19/105* | (2014.01) |
| *H04N 19/139* | (2014.01) |
| *H04N 19/176* | (2014.01) |
| *H04N 19/43* | (2014.01) |
| *H04N 19/436* | (2014.01) |
| *H04N 19/56* | (2014.01) |
| *H04N 19/58* | (2014.01) |
| *H04N 19/583* | (2014.01) |

(52) U.S. Cl.
CPC ........... *H04N 19/176* (2014.11); *H04N 19/43* (2014.11); *H04N 19/436* (2014.11); *H04N 19/56* (2014.11); *H04N 19/58* (2014.11); *H04N 19/583* (2014.11)

(56) References Cited

OTHER PUBLICATIONS

"Bilateral Filter", Wikipedia, Feb. 10, 2020, pp. 1-5.
Bossen F., et al., "JEM Software Manual," Joint Collaborative Team on Video Coding (JCT-VC) of ITU-T SG16 WP3 and ISO/IEC JTC1/SC29/WG11, Document: JCTVC-Software Manual, Retrieved on Aug. 3, 2016, pp. 1-29.
Bross B., et al., "High Efficiency Video Coding (HEVC) text specification draft 10 (for FDIS & Consent)," Joint Collaborative Team on Video Coding (JCT-VC) of ITU-T SG 16 WP 3 and ISO/IEC JTC 1/SC 29/WG 11, Document: JCTVC-L1003_v34, 12th Meeting: Geneva, CH, Jan. 14-23, 2013, 310 pages.
Chen J., et al., "Algorithm Description of Joint Exploration Test Model 7 (JEM7)", JVET-G1001-V1, Joint Video Exploration Team (JVET)of ITU-T SG 16 WP 3 and ISO/IEC JTC 1/SC 29/WG 11, 7th Meeting, Jul. 13, 2017-Jul. 21, 2017, Torino, Aug. 19, 2017 (Aug. 19, 2017), 51 Pages, XP030150980, pp. i-iv, Retrieved from the Internet: URL: http://phenix.int-evry.fr/jvet/doc_end_user/documents/7_Torino/wg11/JVET-G0001-v1.zip, p. 20, Paragraph 2.3.7-p. 23, Paragraph 2.3.7.6, p. 17, Paragraph 2.3.5-p. 18, section 2.
Chien W-J., et al., "CE4-related: Modification on History-based Mode Vector Prediction", 12. JVET Meeting, Oct. 3, 2018-Oct. 12, 2018, Macao, (The Joint Video Exploration Team of ISO/IEC JTC1/SC29/WG11 and ITU-T SG.16), No. JVET-L0401, Oct. 5, 2018 (Oct. 5, 2018), XP030194900, 5 Pages, Retrieved from the Internet: URL: http://phenix.int-evry.fr/jvet/doc_end_user/documents/12_Macao/wg11/JVET-L0401-v4.zip JVET-L0401_r3.docx [retrieved on Oct. 5, 2018] abstract section 2 with its sub-section.
Han Y., et al., "CE4: Modification on History-based Motion Vector Prediction", 13. JVET Meeting; Jan. 9, 2019-Jan. 18, 2019; Marrakech; (The Joint Video Exploration Team of ISO/IEC JTC1/SC29/WG11 and ITU-T SG.16), No. JVET-M0126, Jan. 19, 2019 (Jan. 19, 2019), 9 pages, XP030202546, Retrieved from the Internet: URL: http://phenix.int-evry.fr/jvet/doc_end_user/documents/13_Marrakech/wg11/JVET-M0126-v9.zip JVET-M0126_r6.docx [retrieved on Jan. 19, 2019], the whole document.
He K., et al., "Guided Image Filtering," IEEE Transactions on Pattern Analysis and Machine Intelligence, vol. 35, No. 6, Jun. 2013, 13 Pages.

International Search Report and Written Opinion—PCT/US2019/063674—ISA/EPO—dated Feb. 24, 2020 (18 pp).
"Sum of absolute transformed differences", Wikipedia, Feb. 10, 2020, pp. 1-2.
Wang Y-K. et al., "High Efficiency Video Coding (HEVC) Defect Report", Joint Collaborative Team on Video Coding (JCT-VC) of ITU-T SG 16 WP 3 and ISO/IEC JTC 1/SC 29/WG 11, Doc. JCTVC-N1003_v1, 14th Meeting, Vienna, AT, Jul. 25-Aug. 2, 2013, 311 pages, please consider section 8.5.3.2.6 on p. 125, section 8.5.3.2.7 on pp. 126-129, and section 8.5.3.2.8 on pp. 129 and 130.
Yu R., et al., "CE 4-2.1: Adding Non-adjacent Spatial Merge Candidates", JVET-K0228-v1, The Joint Video Exploration Team of ISO/IEC JTC1/SC29/WG11 and ITU-T SG.16 WP 3, 11th Meeting: Ljubljana, SI, Jul. 10-18, 2018, pp. 1-3.
Zhang (ByteDance) L., et al., "CE4-related: History-based Motion Vector Prediction", 11. JVET Meeting, Jul. 11, 2018-Jul. 18, 2018, Ljubljana, (The Joint Video Explorationteam of ISO/IEC JTC1/SC29/WG11 and ITU-TSG.16), No. JVET-K0104-v5, Jul. 18, 2018 (Jul. 18, 2018), XP030200019, 7 Pages, Retrieved from the Internet:URL:http://phenix.int-evry.fr/jvet/doc_end_user/documents/11_Ljubljana/wg11/JVET-K0104-v5.zip JVET-K0104 r4.docx [retrieved on Jul. 18, 2018] abstract sections 1-2.
Zhang L., et al., "CE4: History-based Motion Vector Prediction (Test 4.4.7)", 12. JVET Meeting; Oct. 3, 2018-Oct. 12, 2018, Macao, (The Joint Video Exploration Team of ISO/IEC JTC1/SC29/WG11 and ITU-T SG.16), No. JVET-L0266, Oct. 4, 2018 (Oct. 4, 2018), 6 pages, XP030194670,URL: http://phenix.int-evry.fr/jvet/doc_end_user/documents/12_Macao/wg11/JVET-L0266-v3.zip JVET-L0266 r1.docx [retrieved on Oct. 4, 2018] Sections 2 and 3.
Zhao J., et al., "CE4-related: Simplification to History Based Motion Vector Prediction", 12, JVET Meeting, Oct. 3, 2018-Oct. 12, 2018, Macao, (The Joint Video Exploration Team of ISO/IEC JTC1/SC29/WG11 and ITU-T SG.16), No. JVET-L0309, Oct. 3, 2018 (Oct. 3, 2018), 5 pages, XP030194485, Retrieved from the Internet: URL: http://phenix.int-evry.fr/jvet/doc_end_user/documents/12_Macao/wg11/JVET-L0309-v3.zip JVET_L0309_r1.docx [retrieved-on Oct. 3, 2018] abstract, Sections 1 and 2.1.
ITU-T H.265, Series H: Audiovisual and Multimedia Systems, Infrastructure of audiovisual services—Coding of moving video, Advanced video coding for generic audiovisual services, The International Telecommunication Union. Dec. 2016, 664 pp.
Certified Copy of 62,725,189, filed on Aug. 30, 2018, 69 Pages.
Li (Tencent) G., et al., "CE4-Related: Extension of Merge and AMVP Candidates for Inter Prediction", 11. JVET Meeting; Jul. 10, 2018-Jul. 18, 2018, LJUBLJANA, (The Joint Video Exploration Team of ISO/IEC JTC1/SC29/WG11 and ITU-T SG.16), No. JVET-K0301-v1, Jul. 11, 2018 (Jul. 11, 2018), XP030199447, 5 Pages, Retrieved from the Internet: URL:http://phenix.int-evry.fr/jvet/doc_end_user/documents/11_Ljubljana/wg11/JVET-K0301-v2.zip JVET-K0301_r1.docx [retrieved on Jul. 11, 2018], figure 2, section 2, table 2.
Solovyev T., et al., "Non-CE4: Merge Mode Modification", Joint Video Experts Team (JVET) of ITU-T SG 16 WP 3 and ISO/IEC JTC 1/SC 29/WG 11, 11th Meeting: Ljubljana, SI, Jul. 10-18, 2018, JVET-K0056-v04, pp. 1-5.
Zhang L., et al., "CE4-Related: History-Based Motion Vector Prediction", Joint Video Experts Team (JVET) of ITU-T SG 16 WP 3 and ISO/IEC JTC 1/SC 29/WG 11, 11th Meeting: Ljubljana, SI, Jul. 10-18, 2018, JVET-K0104-v1, 5 pages.

* cited by examiner

SIMPLIFICATION OF HISTORY-BASED MOTION VECTOR PREDICTION

This application claims the benefit of U.S. Provisional Application No. 62/771,981, filed Nov. 27, 2018, the entire content of which is incorporated by reference herein.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for inter prediction and motion vector reconstruction in video coding. More specifically, this disclosure describes techniques for inter prediction motion vector candidate list (also called motion vector predictor list) construction based on history-based motion vector prediction (HMVP). As described in more detail, a video coder (e.g., video encoder or video decoder) may be configured to perform a simplified pruning operation. Pruning operation, in this disclosure, generally refers to operations to determine whether an HMVP candidate from an HMVP candidate history table is to be added or not to a motion vector predictor list. In some cases, the pruning operation may refer to removal of an HMVP candidate from the motion vector predictor list. As an example of the simplified pruning operation, the video coder may compare a subset of HMVP candidates in an HMVP candidate history table to only a subset of entries in a motion vector predictor list to determine if the subset of HMVP candidates is same or different than the subset of entries in the motion vector predictor list.

The video coder may add one or more of the HMVP candidates in the subset of HMVP candidates to the motion vector predictor list only if the one or more of the HMVP candidates in the subset of HMVP candidates is different than the subset of entries in the motion vector predictor list. In this manner, the video coder may limit the number of comparison operations that are needed to determine which HMVP candidates are to be added to the motion vector predictor list. Limiting the number of comparison operations may reduce the amount of time needed to construct the motion vector predictor list, thereby reducing the amount of time needed to encode or decode video data and improve the overall operation of the video coder.

In one example, the disclosure describes a method for coding video data, the method comprising constructing a history-based motion vector prediction (HMVP) candidate history table that includes motion vector information of previously coded blocks that extend beyond adjacent neighboring blocks of a current block of the video data, constructing a motion vector predictor list, adding one or more HMVP candidates from the HMVP candidate history table to the motion vector predictor list, wherein adding the one or more HMVP candidates from the HMVP candidate history table comprises comparing a first HMVP candidate in the HMVP candidate history table to two entries in the motion vector predictor list and no other entries in the motion vector predictor list and adding the first HMVP candidate to the motion vector predictor list when the first HMVP candidate is different than both of the two entries in the motion vector predictor list, and coding the current block of video data using the motion vector predictor list.

In one example, the disclosure describes a device for coding video data, the device comprising memory configured to store a history-based motion vector prediction (HMVP) candidate history table that includes motion vector information of previously coded blocks that extend beyond adjacent neighboring blocks of a current block of the video data and a motion vector predictor list. The device includes processing circuitry configured to construct the HMVP candidate history table for storage in the memory, construct the motion vector predictor list for storage in the memory, add one or more HMVP candidates from the HMVP candidate history table to the motion vector predictor list, wherein to add the one or more HMVP candidates from the HMVP candidate history table, the processing circuitry is configured to compare a first HMVP candidate in the HMVP candidate history table to two entries in the motion vector predictor list and no other entries in the motion vector predictor list and add the first HMVP candidate to the motion vector predictor list when the first HMVP candidate is different than both of the two entries in the motion vector predictor list, and code the current block of video data using the motion vector predictor list stored in the memory.

In one example, the disclosure describes non-transitory computer-readable storage medium storing instructions thereon that when executed cause one or more processors to construct a history-based motion vector prediction (HMVP) candidate history table that includes motion vector information of previously coded blocks that extend beyond adjacent neighboring blocks of a current block of the video data, construct a motion vector predictor list, add one or more HMVP candidates from the HMVP candidate history table to the motion vector predictor list, wherein the instructions that cause the one or more processors to add the one or more HMVP candidates from the HMVP candidate history table comprise instructions that cause the one or more processors to compare a first HMVP candidate in the HMVP candidate history table to two entries in the motion vector predictor list and no other entries in the motion vector predictor list and add the first HMVP candidate to the motion vector predictor list when the first HMVP candidate is different than both of the two entries in the motion vector predictor list, and code the current block of video data using the motion vector predictor list.

The details of one or more examples are set forth in the accompanying drawings and the description below. Other features, objects, and advantages will be apparent from the description, drawings, and claims.

DETAILED DESCRIPTION

Figure 1:
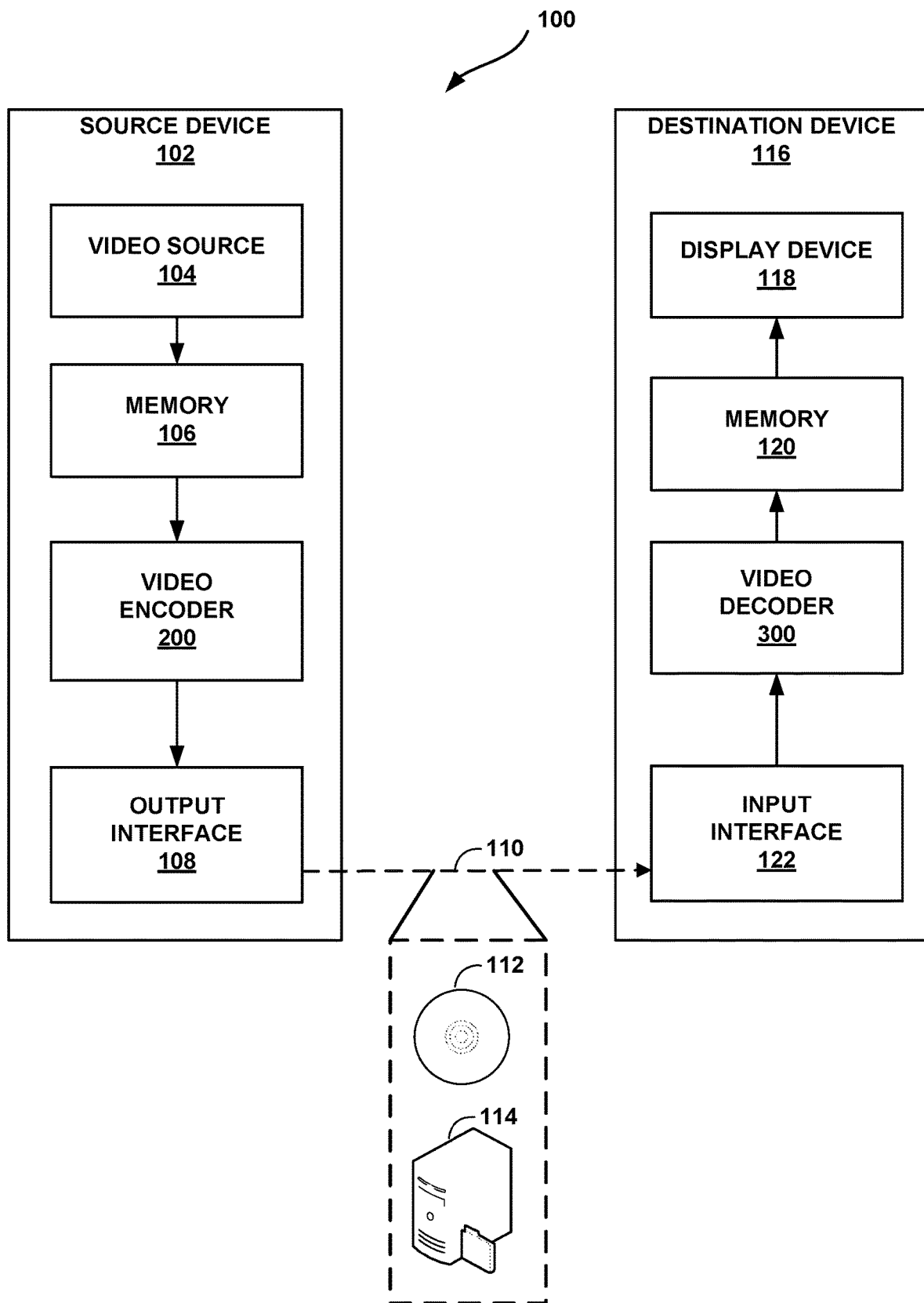
FIG. 1 is a block diagram illustrating an example video encoding and decoding system that may perform the techniques of this disclosure.

Video coding (e.g., video encoding or video decoding) includes inter-prediction or intra block copy (IBC). In both inter-prediction or IBC, a video encoder determines a prediction block based on a motion vector (for IBC, the motion vector may be a block vector) for a current block, determines a residual information (e.g., difference) between the prediction block and the current block, and signals the residual information. A video decoder receives the residual information. In addition, the video decoder determines a motion vector for the current block and determines the prediction block based on the motion vector. The video decoder adds the residual information to the prediction block to reconstruct the current block.

One way in which the video decoder determines the motion vector for the current block is based on a motion vector predictor list. Both the video encoder and the video decoder utilize a similar process to construct respective motion vector predictor lists such that the motion vector predictor list constructed by the video encoder and the motion vector predictor list constructed by the video decoder are the same. The motion vector predictor list includes motion vector information of previously coded blocks, such as spatially neighboring blocks (e.g., blocks that neighbor the current block in the same picture as the current block) and collocated blocks (e.g., blocks that are located at particular locations in other pictures).

The video encoder determines an entry in the motion vector predictor list and signals information indicative of the entry. The video decoder determines motion vector information from the motion vector predictor list based on the entry and determines the motion vector for the current block based on the determined motion vector information. As one example, the video decoder may set the motion vector for the current block equal to the determined motion vector information (e.g., such as in merge mode). As another example, the video decoder may add a motion vector difference (MVD), signaled by the video encoder, to the determined motion vector information to determine the motion vector for the current block (e.g., such as in advanced motion vector prediction (AMVP) mode).

In addition to spatially neighboring blocks or collocated blocks, the video encoder and the video decoder may construct the motion vector predictor list using history-based motion vector prediction (HMVP) candidates. The HMVP candidates may be used as part of HMVP prediction in which the video encoder and video decoder construct an HMVP candidate history table that includes the HMVP candidates. The HMVP candidates may include motion vector information of previously coded blocks that are more extended than spatially neighboring blocks (e.g., further away from the current block than a spatially neighboring block).

In some techniques, the video encoder and the video decoder add HMVP candidates from the HMVP candidate history table into the motion vector predictor list. However, adding HMVP candidates into the motion vector predictor list may result in duplicate entries in the motion vector predictor list. As an example, motion vector information of an HMVP candidate may be the same as motion vector information, already in the motion vector predictor list, for a spatially neighboring block. Accordingly, in some examples, the video encoder and video decoder perform a pruning operation in which an HMVP candidate is added only if the HMVP candidate is different than entries already in the motion vector predictor list. For instance, the video encoder and video decoder compare an HMVP candidate with entries in the motion vector predictor list and only add the HMVP candidate if different from the entries in the motion vector predictor list.

There may be some technical problems in such pruning operations. For example, comparing each of the HMVP candidates to each entry in the motion vector predictor list can require many comparison operations, which can slow down the coding process. However, having duplicate candidates in the motion vector predictor list can also impact coding efficiency. The maximum size of the motion vector predictor list may be fixed. Therefore, if the motion vector predictor list includes duplicate entries and the motion vector predictor list is full (e.g., number of entries equals maximum size), then there is a possibility that a potential entry that would provide better coding efficiency was left out but duplicates of the same entry are present, which could negatively impact coding gains.

This disclosure describes example techniques of constructing the motion vector predictor list using HMVP candidates in a way that balances the gains of reducing comparison operations with the costs of having duplicate entries in the motion vector predictor list. There may be a subset of HMVP candidates and a subset of entries in the motion vector predictor list for which there is a higher likelihood of there being duplicates as compared to the remaining HMVP candidates and remaining entries in the motion vector predictor list.

In one or more examples described in this disclosure, the video encoder and video decoder may compare the subset of HMVP candidates to only the subset of entries in the motion vector predictor list to determine whether to add HMVP candidates of the subset of HMVP candidates. For the remaining HMVP candidates, the video encoder and the video decoder may not compare the HMVP candidates to any of the entries in the motion vector predictor list.

As an example, an entry in the motion vector predictor list may include motion vector information of a left neighboring block of the current block. A first HMVP candidate may include motion vector information of a first block neighboring the left neighboring block on the left, and a second HMVP candidate may include motion vector information of a second block neighboring the first block on the left.

In this example, there is a higher likelihood that the motion information of the first block (e.g., first HMVP candidate) is the same as the motion information of the left neighboring block then the likelihood that the motion information of the second block (e.g., second HMVP candidate) is the same as the motion information of the left neighboring block. Also, the likelihood that the first HMVP candidate is the same as some other entries in the motion vector predictor list may be relatively small because the other entries in the motion vector predictor list may not neighbor or be relatively proximate to the first HMVP.

The first HMVP candidate having a higher likelihood of having the same motion vector information as the left neighboring block may be due to the proximity of the first block to the left neighboring block. In general, there is a higher likelihood of motion vector information of blocks nearer to one another being the same than the likelihood of motion vector information of blocks further away being the same.

In some examples, the video encoder and the video decoder may compare the first HMVP candidate to the entry in the motion vector predictor list for the motion vector information of the left neighboring block, and possibly a limited few more entries (e.g., one more entry) in the motion vector predictor list, but may not compare the first HMVP candidate to any of the remaining entries in the motion vector predictor list. If the first HMVP candidate is different than the entries in the subset of the motion vector predictor list, the video encoder and the video decoder may add the first HMVP candidate in the motion vector predictor list. If the first HMVP candidate is same as any of the entries in the subset of the motion vector predictor list, the video encoder and the video decoder may not add the first HMVP candidate in the motion vector predictor list.

In this manner, the number of compare operations is reduced (e.g., the video encoder and the video decoder may compare the first HMVP candidate to only a subset of entries in the motion vector predictor list). In some examples, there may be a chance that there are duplicate entries in the motion vector predictor list. As an example, there is a possibility that one of the entries in the motion vector predictor list that was not compared with the first HMVP candidate has the same motion vector information as the first HMVP candidate. In this case, there may be duplicate motion vector information in the motion vector predictor list. However, in some examples, the entries in the motion vector predictor list with which the first HMVP candidate was not compared may be for blocks that are relatively far away from the first HMVP candidate. Therefore, there may be a relatively low likelihood that the first HMVP candidate is the same as any of the remaining entries in the motion vector predictor list with which the first HMVP candidate is not compared.

Accordingly, the number of operations performed for pruning may be reduced while keeping the likelihood of duplicate motion vector information low. For example, as part of the pruning operation of the motion vector predictor list, the video encoder and the video decoder may compare a first HMVP candidate in the HMVP candidate history table to two entries in the motion vector predictor list and no other entries in the motion vector predictor list, and add the first HMVP candidate to the motion vector predictor list when the first HMVP candidate is different than both of the two entries in the motion vector predictor list. In this example, although the first HMVP candidate is not compared against the remaining entries in the motion vector predictor list, the likelihood that one of the remaining entries in the motion vector predictor list is a duplicate of the first HMVP candidate is low due to the first HMVP candidate being for a block that is not proximate to the blocks whose motion vector information is used to construct the remaining entries in the motion vector predictor list.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for history-based motion vector prediction. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for history-based motion vector prediction. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between devices 102, 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some example, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may modulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Examples of storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., DSL, cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receiver, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream computer-readable medium 110 may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions.

High Efficiency Video Coding (HEVC) or ITU-T H.265 (G. J. Sullivan, J.-R. Ohm, W.-J. Han, T. Wiegand "Overview of the High Efficiency Video Coding (HEVC) Standard," IEEE Transactions on Circuits and Systems for Video Technology, vol. 22, no. 12. pp. 1649-1668, December 2012), including its range extension, multiview extension (MV-HEVC) and scalable extension (SHVC), has been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG). An HEVC draft specification, and referred to as HEVC WD hereinafter, is available from http://phenix.int-evry.fr/jct/doc_end_user/documents/14_Vienna/wg11/JCTVC-N1003-v1.zip. The latest version of the Final Draft of International Standard (FDIS) of HEVC can be found in http://phenix.it-sudparis.eu/jct/doc_end_user/documents/12_Geneva/wg11/JCTVC-L1003-v34.zip.

ITU-T VCEG (Q6/16) and ISO/IEC MPEG (JTC 1/SC 29/WG 11) are now studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area. The JVET first met during 19-21 Oct. 2015. A version of reference software, i.e., Joint Exploration Model 7 (JEM 7) could be downloaded from: https://jvet.hhi.fraunhofer.de/svn/svn_HMJEMSoftware/tags/HM-16.6-JEM-7.2/ An Algorithm description of Joint Exploration Test Model 7 (JEM-7) is described in J. Chen, E. Alshina, G. J. Sullivan, J.-R. Ohm, J. Boyce, "Algorithm Description of Joint Exploration Test Model 7", JVET-G1001, July, 2017.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM) and/or Versatile Video Coding (VVC). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to examples of JEM and/or VVC. According to examples of JEM/VVC, a video coder (such as video encoder 200) partitions a picture into a plurality of coding tree units (CTUs). Video encoder 200 may partition a CTU according to a tree structure, such as a quadtree-binary tree (QTBT) structure. The QTBT structure of examples of JEM/VVC removes the concepts of multiple partition types, such as the separation between CUs, PUs, and TUs of HEVC. A QTBT structure of examples of JEM/VVC includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In some examples, video encoder 200 and video decoder 300 may use a single QTBT structure to represent each of the luminance and chrominance components, while in other examples, video encoder 200 and video decoder 300 may use two or more QTBT structures, such as one QTBT structure for the luminance component and another QTBT structure for both chrominance components (or two QTBT structures for respective chrominance components).

Video encoder 200 and video decoder 300 may be configured to use quadtree partitioning per HEVC, QTBT partitioning according to examples of JEM/VVC, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

JEM or VVC also provides an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. JEM or VVC provides sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

As described above, in some examples, video encoder 200 and video decoder 300 may be configured to encode or decode a current block using inter-prediction. In inter-prediction, video encoder 200 and video decoder 300 determine a prediction block based on a motion vector for the current block. For example, the motion vector for the current block points to a prediction block in another picture or possibly in the same picture for intra block copy (IBC) mode.

In some examples, rather than video encoder 200 signaling the value of the motion vector for the current block, video encoder 200 may signal information of a motion vector predictor, which video decoder 300 uses to determine the motion vector for the current block. For example, video encoder 200 and video decoder 300 may be configured to construct a motion vector predictor list that includes motion vector information of previously encoded or decoded blocks. The motion vector information of previously encoded or decoded blocks may be considered as motion vector predictors. Video encoder 200 and video decoder 300 may perform similar operations to construct the motion vector predictor lists.

Video encoder 200 may signal information indicative of an entry into the motion vector predictor list that identifies a particular motion vector predictor. Video decoder 300 may determine the motion vector predictor based on the entry into the motion vector predictor list. For merge mode, video decoder 300 may set the motion vector predictor equal to the motion vector for the current block. For AMVP mode, video decoder 300 may further receive, from video encoder 200, a motion vector difference (MVD) between the motion vector predictor and the motion vector for the current block. Video decoder 300 may add the MVD to the motion vector predictor to determine the motion vector for the current block.

The motion vector predictor list may include as motion vector predictors the motion vector information of spatially neighboring blocks (e.g., blocks that are adjacent to the current block and are in the same picture as the current block) and the motion vector information of a collocated blocks (e.g., blocks that are in another picture at particular locations). The collocated block may be referred to as a temporally neighboring block.

Video encoder 200 and video decoder 300 may add motion vector information of the spatially neighboring blocks and the collocated blocks in the motion vector candidate list to construct the motion vector candidate list. In one or more examples, video encoder 200 and video decoder 300 may be configured to further add history-based motion vector prediction (HMVP) candidates from an HMVP candidate history table into the motion vector candidate list.

HMVP candidates refer to motion vector information of blocks that extend beyond adjacent neighboring blocks of the current block. For instance, a block adjacent to the current block and to the left of the current block may be an example of a left neighboring block that is a spatially neighboring block. Motion information of the left neighboring block may be included in the motion vector candidate list. A block adjacent to the left neighboring block is not a spatially neighboring block, and motion information of such a block is an example of HMVP candidate that is part of the HMVP candidate history table.

This disclosure describes example techniques that video encoder 200 and video decoder 300 may perform to add HMVP candidates from the HMVP candidate history table into the motion vector predictor list. As one example, the HMVP candidate history table may be considered as including a first subset of HMVP candidates and a second subset of HMVP candidates. In one example, the first subset of HMVP candidates includes two (e.g., first two) HMVP candidates from the HMVP candidate history table, and the second subset of HMVP candidates includes the remaining HMVP candidates in the HMVP candidate history table.

Video encoder 200 and video decoder 300 may be configured to compare each of the HMVP candidates in the first subset of HMVP candidates with a subset of entries (e.g., less than all entries) in the motion vector candidate list. As an example, video encoder 200 and video decoder 300 may construct the motion vector candidate list based on motion vector information of spatially neighboring blocks and collocated blocks. Video encoder 200 and video decoder 300 may compare each of the HMVP candidates in the first subset of HMVP candidates with two entries of the motion vector candidate list, and add the HMVP candidates in the first subset of HMVP candidates if the HMVP candidates are different than the entries in the motion vector candidate list.

For instance, the first subset of HMVP candidates can include a first HMVP candidate and a second HMVP candidate. In this example, video encoder 200 and video decoder 300 may compare the first HMVP candidate to a first entry in the motion vector candidate list and a second entry in the motion vector candidate list, and to no other entry in the motion vector candidate list. If the first HMVP candidate is different than the first entry and the second entry, video encoder 200 and video decoder 300 may add the first HMVP candidate into the motion vector candidate list.

Video encoder 200 and video decoder 300 may compare the second HMVP candidate to the first entry in the motion vector candidate list and the second entry in the motion vector candidate list, and to no other entry in the motion vector candidate list. If the second HMVP candidate is different than the first entry and the second entry, video encoder 200 and video decoder 300 may add the second HMVP candidate into the motion vector candidate list.

The first HMVP candidate and the second HMVP candidate are used to indicate that two HMVP candidates are selected from the HMVP candidates. The first HMVP candidate and the second HMVP candidate may be the first two candidates in the HMVP candidate history table but the example techniques are not so limited. Similarly, the first entry and the second entry in the motion vector predictor list may be the first two entries in the motion vector predictor list but the example techniques are not so limited.

If after adding one or more (e.g., one or both) HMVP candidates of the first subset of HMVP candidates, the total number of entries in the motion vector predictor list is less than the maximum number of entries in the motion vector predictor list, then video encoder 200 and video decoder 300 may add HMVP candidates from the second subset of HMVP candidates until the size of the motion vector predictor list reaches the maximum size or there are no more HMVP candidates left in the second subset of HMVP candidates. In one or more examples, video encoder 200 and video decoder 300 may add HMVP candidates from the second subset of HMVP candidates without comparing the HMVP candidates from the second subset of HMVP candidates with entries in the motion vector predictor list.

Video encoder 200 and video decoder 300 may construct the motion vector predictor list to include HMVP candidates, while balancing the cost of performing comparison operations with benefits of minimizing duplication of entries in the motion vector predictor list. For example, video encoder 200 and video decoder 300 may add HMVP candidates into the motion vector predictor list without performing any comparison operations to determine if the HMVP candidates are duplicates of already existing entries in the motion vector predictor list. In this case, there is a possibility that the motion vector predictor list becomes full but potentially good motion vector predictor candidates (e.g., motion vectors that are close to the actual motion vector) are excluded because duplicate motion vectors are present in the motion vector predictor list and the motion vector predictor list is full. However, comparing each HMVP candidate with each entry in the motion vector predictor list to exclude any duplicates may increase the processing time required to construct the motion vector predictor list, which in turn increases the time of the encoding or decoding process.

In accordance with one or more examples described in this disclosure, by limiting the number of comparisons between HMVP candidates and entries in the motion vector predictor list to determine if there are duplicates, the number of comparison operations that need to be performed are limited. For example, as described above, video encoder 200 and video decoder 300 may compare a first subset of the HMVP candidates (e.g., two HMVP candidates) to a subset of entries in the motion vector predictor list (e.g., two entries in the motion vector predictor list). Video encoder 200 and video decoder 300 may add one or more of the HMVP candidates from the first subset that are different from the subset of entries of the motion vector predictor list and exclude one or more of the HMVP candidates from the first subset that are same as one of the entries in the subset of entries of the motion vector predictor list. This way the number of comparisons is reduced as compared to the case where all HMVP candidates are compared with all entries in the motion vector predictor list, thereby decreasing the amount of time needed to construct the motion vector predictor list.

Furthermore, the likelihood that a particular HMVP candidate is a duplicate of an entry in the motion vector predictor list may be based on a location of a block of the HMVP candidate and a block whose motion vector information is included in the motion vector predictor list. For example, a first entry in the motion vector predictor list may include motion vector information of a left neighboring block and a second entry in the motion vector predictor may include motion vector information of an above neighboring block. In some examples, a first HMVP candidate may be motion vector information of a block that neighbors to the left of the left neighboring block and a second HMVP candidate may be motion vector information of a block that is above the above neighboring block.

Due to the relative locations of the block for the first HMVP candidate relative to the left and above neighboring blocks, there is a higher likelihood that the first HMVP candidate is similar to the first entry or the second entry of the motion vector predictor list than any other entry in the motion vector predictor list. Similarly, due to the relative locations of the block for the second HMVP candidate relative to the left and above neighboring blocks, there is a higher likelihood that the second HMVP candidate is similar to the first entry or the second entry of the motion vector predictor list than any other entry in the motion vector predictor list.

Due to the relative locations of the block for the first HMVP candidate relative to block for the second HMVP, there may be a relatively low likelihood that the first HMVP candidate and the second HMVP candidate is same as any of the other entries (e.g., excluding the first and second entries) in the motion vector predictor list. Also, due to the relative locations of their respective blocks, there is a relatively low likelihood that the remaining HMVP candidates (e.g., excluding the first and second HMVP candidates) are the same as any of the entries in the motion vector predictor list. Accordingly, in one or more examples, video encoder 200 and video decoder 300 may add a second subset of the HMVP candidates into the motion vector predictor list without comparing the HMVP candidates to any of the entries in the motion vector predictor list until the motion vector predictor list is full or there are no more HMVP candidates available.

Again, in the above example, the first subset of HMVP candidates that include the first and second HMVP candidates may be the first two HMVP candidates in the HMVP candidate history table, but the example techniques are not so limited. Also, the second subset of HMVP candidates may include the remaining HMVP candidates excluding the first and second HMVP candidates. Moreover, the subset of entries in the motion vector predictor list may be the first two entries in the motion vector predictor list but the example techniques are not so limited.

This disclosure may generally refer to "signaling" certain information, such as syntax elements. The term "signaling" may generally refer to the communication of values syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2:
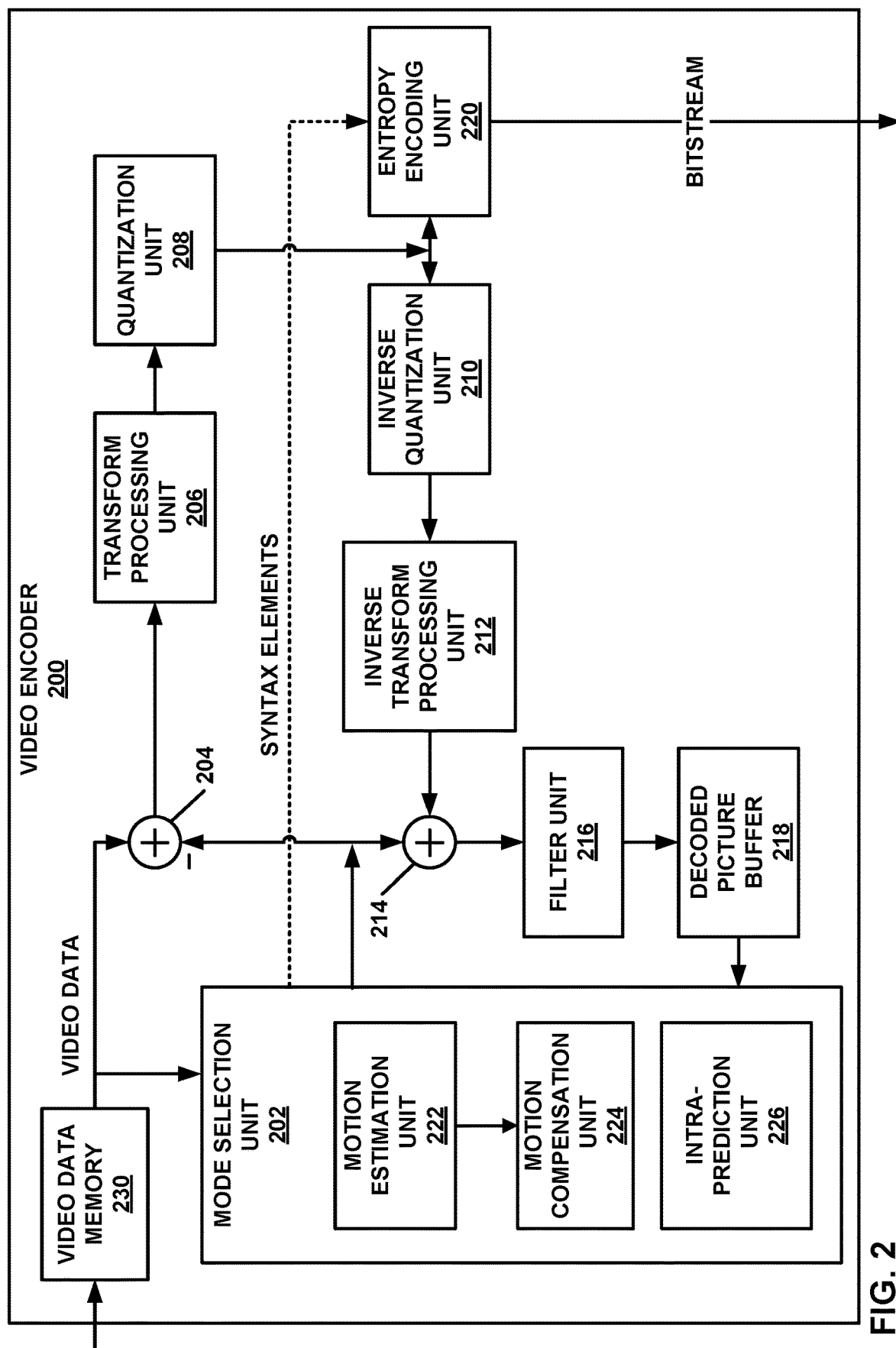
FIG. 2 is a block diagram illustrating an example video encoder that may perform the techniques of this disclosure.
Figure 3:
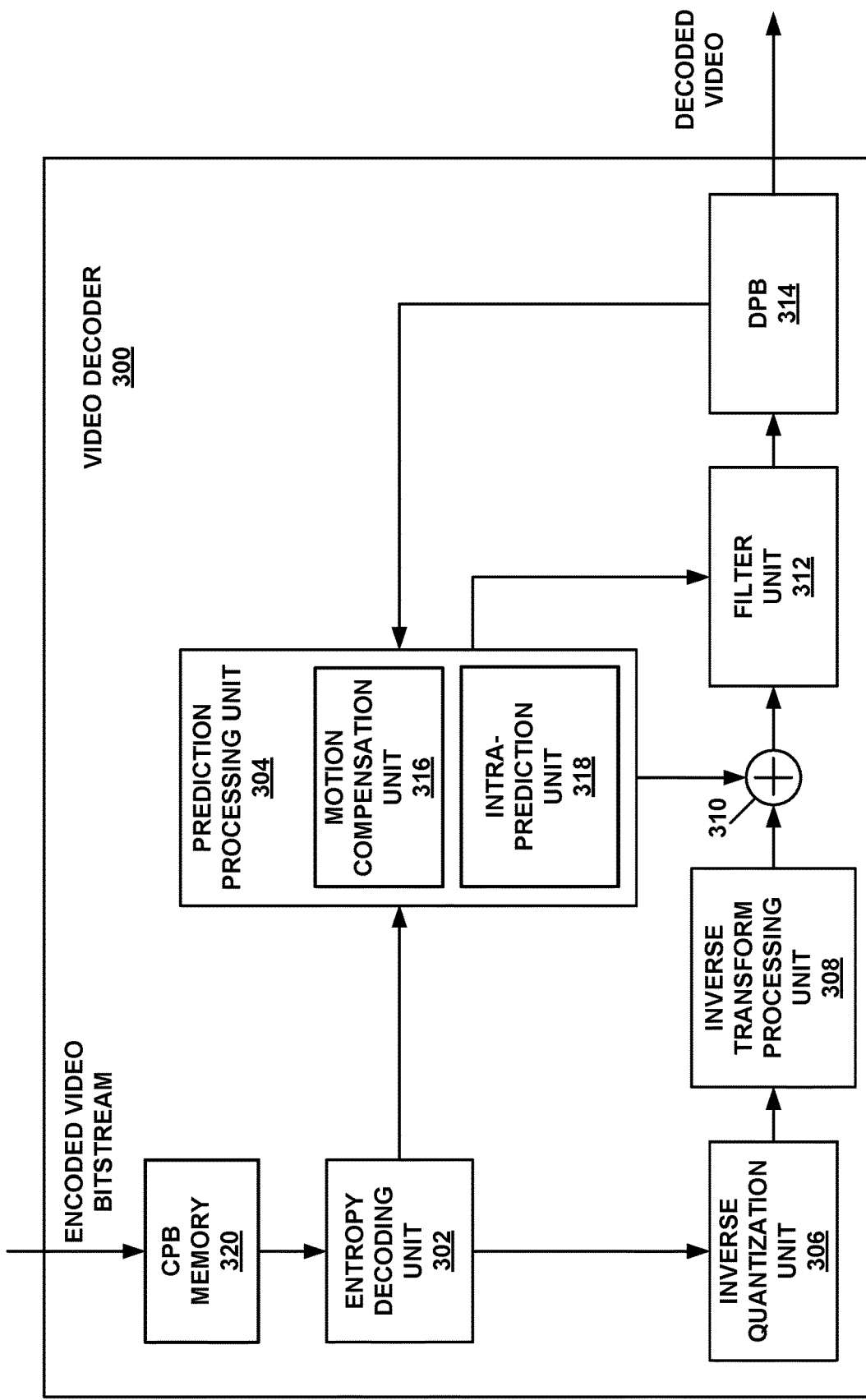
FIG. 3 is a block diagram illustrating an example video decoder that may perform the techniques of this disclosure.

Examples of video encoder 200 and video decoder 300 are illustrated and described in more detail with respect to FIGS. 2 and 3. Prior to describing FIGS. 2 and 3, the following describes some additional details of the video coding process, such as motion vector prediction, with respect to FIGS. 4A, 4B, 5, and FIG. 6.

The following reviews CU structure and motion vector prediction in HEVC. In HEVC, the largest coding unit in a slice is called a coding tree block (CTB) or coding tree unit (CTU). A CTB contains a quad-tree, the nodes of which are coding units.

The size of a CTB can range from 16×16 to 64×64 in the HEVC main profile (although technically 8×8 CTB sizes can be supported). A coding unit (CU) could be the same size of a CTB to as small as 8×8. Each coding unit is coded with one mode, such as inter-coded or intra-coded. Inter-coded may also be referred to as inter-prediction coded or inter-predicted. Intra-coded may also be referred to as intra-prediction coded or intra-predicted.

When a CU is inter-coded, the CU may be further partitioned into 2 or 4 prediction units (PUs) or may be one PU when further partition is not applied. When two PUs are present in one CU, the PUs can be half size rectangles or two rectangle size with ¼ or ¾ size of the CU. When the CU is inter-coded, each PU has one set of motion information, which is derived with an inter-prediction mode.

The following reviews motion vector prediction. In the HEVC standard, there are two inter-prediction modes, named merge (skip is considered as a special case of merge) and advanced motion vector prediction (AMVP) modes, respectively, for a prediction unit (PU). In either AMVP or merge mode, a motion vector (MV) candidate list is maintained for multiple motion vector predictors. The MV candidate list may be referred to as motion vector predictor list. The motion vector(s), as well as reference indices in the merge mode, of the current PU are generated by taking one candidate from the MV candidate list. The MV candidate list may contain up to 5 candidates for the merge mode and only two candidates for the AMVP mode. A merge candidate may contain a set of motion information, e.g., motion vectors corresponding to both reference picture lists (list 0 and list 1) and the reference indices. If a merge candidate is identified by a merge index, the reference pictures used for the prediction of the current block, as well as the associated motion vectors are determined. In other words, the motion vector and the reference picture identified in the motion vector predictor list by the merge index are set equal to the motion vector and reference picture of the current block.

On the other hand, under AMVP mode, for each potential prediction direction from either list 0 or list 1, a reference index needs to be explicitly signaled, together with an MV predictor (MVP) index to the MV candidate list since the AMVP candidate contains only a motion vector. In AMVP mode, the predicted motion vectors can be further refined (e.g., based on a motion vector difference (MVD) described above). The candidates for both modes are derived similarly from the same spatial and temporal neighboring blocks.

Figure 4A:
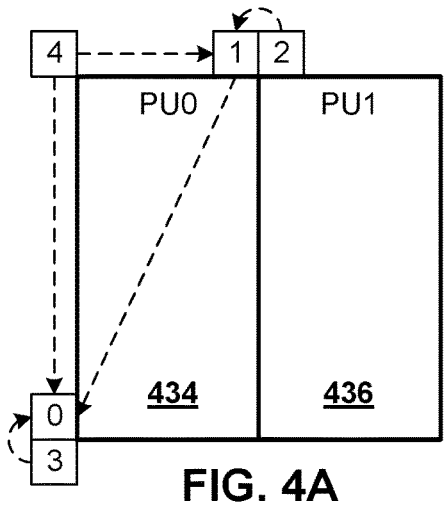
FIG. 4A is a conceptual diagram showing spatial neighboring candidates for merge mode.
Figure 4B:
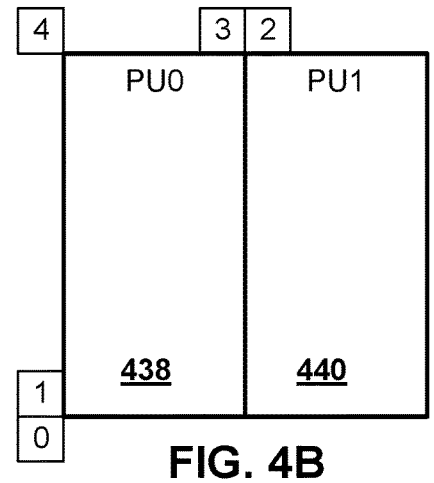
FIG. 4B is a conceptual diagram showing spatial neighboring candidates for advanced motion vector prediction (AMVP) mode.

The following reviews spatial neighboring blocks whose motion vector information forms as motion vector predictors. In some examples, spatial MV candidates (e.g., spatial motion vector predictors) are derived from the neighboring blocks shown in FIGS. 4A and 4B for a specific PU ($PU_0$) 434 and 438, respectively, although the methods for generating the candidates from the blocks differ for merge and AMVP modes. FIG. 4A is a conceptual diagram showing spatial neighboring candidates for merge mode. FIG. 4B is a conceptual diagram showing spatial neighboring candidates for AMVP mode.

In merge mode, in some examples, up to five spatial MV candidates can be derived with the order showed in FIG. 4A, and the order is the following: left (0, A1), above (1, B1), above right (2, B0), below left (3, A0), and above left (4, B2), as shown in FIG. 4A. For instance, for PU0 434, block A1 is identified as 0 and is left of PU0 434, block B1 is identified as 1 and is above of PU0 434, block B0 is identified as 2 and is above right of PU0 434 and above PU1 436, block A0 is identified as 3 and is below left of PU0 434, and block B2 is identified as 4 and is above left of PU0 434.

In AMVP mode, in some examples, the neighboring blocks are divided into two groups: a left group that includes the block 0 and 1 that are below left and left of PU0 438, respectively, and an above group that includes the blocks 2, 3, and 4 that are above right, above, and above left of PU01 438 as shown in FIG. 4B. Block 2 is above PU1 440. For each group, the potential candidate in a neighboring block referring to the same reference picture as that indicated by the signaled reference index has the highest priority to be chosen to form a final candidate of the group. All neighboring blocks may not contain a motion vector pointing to the same reference picture. Therefore, if such a candidate cannot be found, the first available candidate may be scaled to form the final candidate, and thus the temporal distance differences can be compensated.

Figure 5:
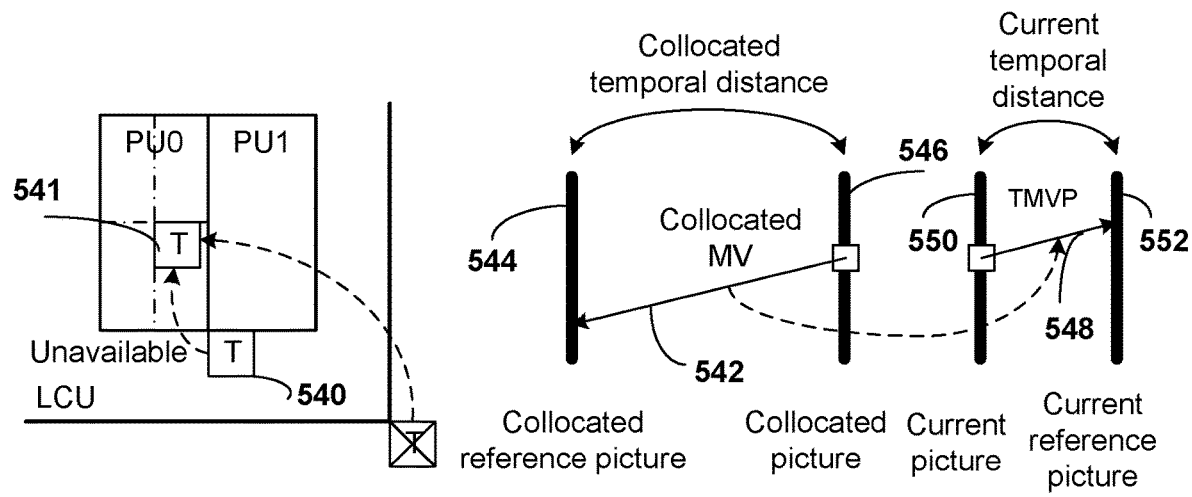
FIG. 5 is a conceptual diagram showing a temporal motion vector predictor (TMVP) candidate and motion vector scaling.

The following reviews temporal motion vector prediction with FIG. 5. FIG. 5 is a conceptual diagram showing a temporal motion vector predictor (TMVP) candidate and motion vector scaling for TMVP.

In some examples, a TMVP candidate, if enabled and available, is added into the MV candidate list (e.g., motion vector predictor list) after spatial motion vector candidates (e.g., motion vector information of spatially neighboring blocks). The process of motion vector derivation for TMVP candidate is the same for both merge and AMVP modes, however the target reference index for the TMVP candidate in merge mode is set to 0.

In some examples, the primary block location for TMVP candidate derivation is the bottom right block outside of the collocated PU as shown in FIG. 5 as a block T 540. The location of block T 540 may be to compensate the bias to the above and left blocks used to generate spatial neighboring candidates. However, if block T 540 is located outside of the current CTB row or motion information is not available for block T 540, block T 540 is substituted with a center block 541 of the PU.

In FIG. 5, a motion vector 548 for TMVP candidate in current picture 550 is derived from the collocated PU of the collocated picture 546, indicated in the slice level. The motion vector (MV) for the collocated PU is called collocated MV 542. To derive the TMVP candidate motion vector, the collocated MV 542 may be scaled to compensate for the temporal distance differences, as shown in FIG. 5. For instance, the temporal difference between collocated picture 546 and collocated reference picture 544 and the temporal difference between current picture 550 and current reference picture 552 is used to scale collocated MV 542 to generate motion vector 548.

The following reviews some other aspects of motion prediction in HEVC. Several aspects of merge and AMVP modes are described below.

Motion Vector Scaling:

The value of motion vectors can be proportional to the distance of pictures in the presentation time. A motion vector associates two pictures, the reference picture, and the picture containing the motion vector (namely the containing picture). When a motion vector is utilized to predict the other motion vector, the distance of the containing picture and the reference picture is calculated based on the Picture Order Count (POC) values.

For a motion vector to be predicted, both its associated containing picture and reference picture may be different. Therefore, a new distance (based on POC) is calculated, and the motion vector is scaled based on these two POC distances. For a spatial neighboring candidate, the containing pictures for the two motion vectors are the same, while the reference pictures are different. In HEVC, motion vector scaling applies to both TMVP and AMVP for spatial and temporal neighboring candidates.

Artificial Motion Vector Candidate Generation:

If a motion vector candidate list is not complete (e.g., fewer candidates than a predetermined number), artificial motion vector candidates are generated and inserted at the end of the candidate list until the candidate list has all candidates. In merge mode, there are two types of artificial MV candidates: combined candidate derived only for B-slices and zero candidates used only for AMVP if the combined candidate derived only for B-slices does not provide enough artificial candidates to fill the candidate list.

For each pair of candidates that are already in the candidate list and have the necessary motion information, bi-directional combined motion vector candidates are derived by a combination of the motion vector of the first candidate referring to a picture in the list 0 and the motion vector of a second candidate referring to a picture in the list 1.

Pruning process for candidate insertion:

Candidates from different blocks may happen to be the same, which decreases the efficiency of a merge/AMVP candidate list. A pruning process is applied to address this problem. The pruning process compares one candidate against the others in the current candidate list to avoid inserting identical candidates. To reduce the complexity, only a limited number of pruning processes are applied to avoid comparing each potential candidate with all the other existing candidates in the list.

The development of VVC includes enhanced motion vector prediction. For example, several inter coding tools have been proposed which derive or refine the candidate list of motion vector prediction or merge prediction for a current block. Several examples are described below.

The following describes history-based motion prediction (HMVP), as described in L. Zhang, K. Zhang, H. Liu, Y. Wang, P. Zhao, and D. Hong, "CE4-related: History-based Motion Vector Prediction", JVET-K0104, July, 2018. HMVP is a history-based method in which video encoder 200 and video decoder 300 determine an MV predictor for each block from a list of MVs decoded from the past, in addition to those MVs in immediately adjacent causal neighboring motion fields (e.g., MVs of immediately spatially neighboring blocks are examples of MVs in immediately adjacent causal neighboring motion fields). HMVP includes video encoder 200 and video decoder 300 constructing a table for previously decoded motion vectors as HMVP candidates.

In some embodiments, video encoder 200 and video decoder 300 can construct a table with multiple HMVP candidates during the encoding/decoding process. Constructing the table may include adding HMVP candidates to the table as well as removing HMVP candidates from the table. Video encoder 200 and video decoder 300 may be configured to empty the table (e.g., remove the HMVP candidates) when a new slice is encountered for encoding or decoding. Whenever there is an inter-coded block, video encoder 200 and video decoder 300 may be configured to insert the associated motion information into the table in a first-in-first-out (FIFO) fashion as a new HMVP candidate. Then, video encoder 200 and video decoder 300 may be configured to apply a constraint FIFO rule. In some techniques, when inserting an HMVP candidate to the table, video encoder 200 and video decoder 300 may be configured to first apply a redundancy check (e.g., pruning) to determine whether there is an identical HMVP candidate in the table. If found, video encoder 200 and video decoder 300 may be configured to remove that particular HMVP candidate from the table and all the HMVP candidates after that candidate are moved.

Video encoder 200 and video decoder 300 may be configured to use HMVP candidates in the merge candidate list construction process. For example, video encoder 200 and video decoder 300 may be configured to insert all HMVP candidates from the last entry to the first entry in the table after the TMVP candidate. Video encoder 200 and video decoder 300 may be configured to apply pruning on the HMVP candidates. Once the total number of available merge candidates reaches the signaled or predetermined maximum number of allowed merge candidates, video encoder 200 and video decoder 300 may be configured to terminate the merge candidate list construction process. The merge candidate list construction is one example of constructing a motion vector predictor list.

Similarly, video encoder 200 and video decoder 300 may be configured to use HMVP candidates in the AMVP candidate list construction process to construct an AMVP candidate list. Video encoder 200 and video decoder 300 may be configured to insert the motion vectors of the last K HMVP candidates in the table after the TMVP candidate. Video encoder 200 and video decoder 300 may be configured to use only HMVP candidates with the same reference picture as the AMVP target reference picture to construct the AMVP candidate list. Video encoder 200 and video decoder 300 may be configured to apply pruning on the HMVP candidates. The AMVP candidate list construction is another example of constructing a motion vector predictor list.

Figure 6:
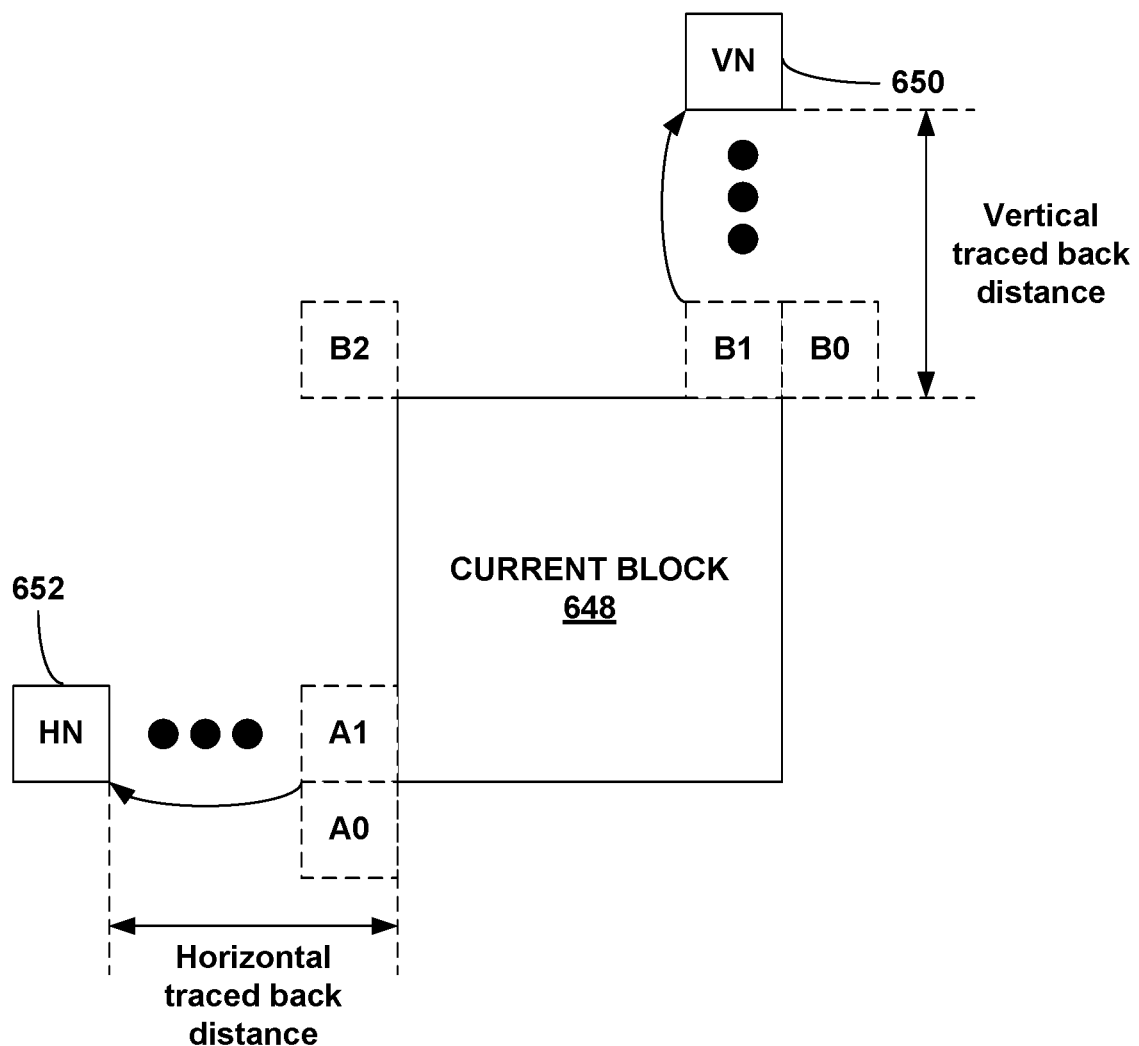
FIG. 6 is a conceptual diagram showing fetching of non-adjacent spatial merge candidates.

The following describes non-adjacent spatial merge candidates. The construction of non-adjacent spatial merge candidates, as described in R. Yu, et. al., "CE 4-2.1: Adding non-adjacent spatial merge candidates," Joint Video Experts Team (JVET) of ITU-T SG 16 WP 3 and ISO/IEC JTC 1/SC 29/WG 11, 11$^{th}$ Meeting: Ljubljana, S I, 10-18 Jul. 2018 (hereinafter "JVET-K0228"), involves derivation of new spatial candidates from two non-adjacent neighboring positions. For example, as shown in FIG. 6, video encoder 200 and video decoder 300 may derive new spatial candidates from the closest non-adjacent block 650 above current block 648 and/or from the closest non-adjacent block 652 to the left of current block 648. For instance, FIG. 6 illustrates current block 648 with neighboring blocks A0, A1, B2, B1, and B0. In some examples, the non-adjacent spatial merge candidates include motion information of block HN 652 and block VN 650 of FIG. 6 that are not spatially neighboring to current block 648. That is, FIG. 6 illustrates examples of blocks whose motion vector information may be used to construct the HMVP candidate history table.

Blocks 650 and 652 are limited within a maximum distance of 1 CTU to the current block 648. The fetching process of non-adjacent candidates starts with tracing the previous decoded blocks in the vertical direction. The vertical inverse tracing stops when an inter block is encountered or the traced back distance reaches 1 CTU size.

The fetching process then traces the previous decoded blocks in the horizontal direction. The criterion for stopping the horizontal fetching process depends on whether there is a vertical non-adjacent candidate successfully being fetched or not. If no vertical non-adjacent candidate is fetched, the horizontal fetching process stops when an inter-coded block is encountered or the traced back distance exceeds one CTU size threshold. If there is a vertical non-adjacent candidate fetched, then the horizontal fetching process stops when an inter-coded block which contains a different MV from the vertical non-adjacent candidate is encountered or the traced back distance exceeds one CTU size threshold. The fetched non-adjacent neighboring candidates are added before the TMVP candidate in the merge candidate list.

The following describes pairwise average candidates. Pairwise average candidates are used in VTM3.0 (VVC Test Model 3.0). Video encoder 200 and video decoder 300 may be configured to generate pairwise average candidates by averaging predefined pairs of candidates in the current merge candidate list (includes spatial candidates, TMVP, and HMVP). In one example, the predefined pairs are defined as {(0, 1), (0, 2), (1, 2), (0, 3), (1, 3), (2, 3)}, where the numbers denote the merge indices to the merge candidate list. Video encoder 200 and video decoder 300 may be configured to calculate the averaged motion vectors separately for each reference list. If both motion vectors are available in one list, video encoder 200 and video decoder 300 may be configured to average these two motion vectors even when the two motion vectors point to different reference pictures. If only one motion vector is available, video encoder 200 and video decoder 300 may be configured to use the one motion vector directly. If no motion vector is available, video encoder 200 and video decoder 300 may be configured to keep the reference picture list(s) (e.g., one or both of list 0 and list 1) invalid. The pairwise average candidates replace the combined candidates in the HEVC standard.

For example, in bi-direction prediction, a motion vector candidate may include two motion vectors pointing to two references in list 0 and list 1, or the motion vector candidate may include only one motion vector pointing to list 0 (or list 1). Therefore, for uni-direction candidate, one list is invalid (e.g., if motion vector is pointing to list 0, then list 1 is invalid, and vice-versa).

The following describes an example of determining pairwise average candidate for candidate 0 and candidate 1, where candidate 0 is a bi-prediction candidate and includes two motion vectors: (MV0_list0(x_list0, y_list0)) and (MV0_list1(x_list1, y_list1)) and candidate 1 is a uni-direction prediction only including one motion vector (MV1_list0(x_list0, y_list0)). In this example, list 1 is invalid for candidate 1, and the generated pairwise candidate is bi-direction MV ((MV0_list0+MV1_list0/2), MV0_list1).

As described above, HMVP prediction mode uses a history-based lookup table which stores decoded MVs from the past. The HMVP lookup table (also called HMVP candidate history table) can be applied in inter prediction modes such as merge mode and AMVP mode. When adding an HMVP candidate from the history table to a merge list or an AMVP list, video encoder 200 and video decoder 300 may be configured to apply a redundancy check to find whether there is an identical (e.g., duplicate) candidate in the list. In some examples, as described above, applying a full redundancy check may be too complex (e.g., require many computational resources or clock cycles), especially for hardware implementation. In some examples, the HMVP candidate history table should be updated after encoding/decoding an inter CU. Also, when adding a new HMVP candidate to the HMVP candidate history table, a redundancy check is also applied.

In view of these drawbacks, this disclosure describes several techniques where video encoder 200 and video decoder 300 may be configured to construct an HMVP candidate history table using a modified construction process. In addition, this disclosure describes additional techniques where video encoder 200 and video decoder 300 may be configured to determine a candidate from the HMVP candidate history table to use in a motion vector predictor list (e.g., for a merge motion vector predictor list, for an affine motion vector predictor list, and/or for an AMVP motion vector predictor list).

In one example of the disclosure, video encoder 200 and video decoder 300 may be configured to add a new HMVP candidate to the HMVP candidate history table without performing a redundancy check. If the number of the HMVP candidates reaches the maximum allowed size of the HMVP candidate history table, video encoder 200 and video decoder 300 may be configured to remove the oldest HMVP candidate in the table, then add the new HMVP candidate.

In another example of the disclosure, video encoder 200 and video decoder 300 may be configured to subsample the HMVP candidate history table when adding one or more HMVP candidates from the HMVP candidate history table to a motion vector predictor list, such as a merge candidate list, AMVP candidate list or affine candidate list. For example, the size of the HMVP candidate history table may be N, the subsampling rate may be R, and the initial position in the HMVP candidate history table may be S. In one example, N=10, R=3, S=1. So, the HMVP candidate history table is {c1, c2, c3, c4, c5, c6, c7, c8, c9, c10}. In forward order, the selected HMVP candidates are {c1, c4, c7, c10}. If using reverse order to select the candidates, the selected HMVP candidates are {c10, c7, c4, c1}.

That is, in one example, the HMVP candidates include {c1, c2, c3, c4, c5, c6, c7, c8, c9, c10}. If the subsampling rate is 3, then video encoder 200 and video decoder 300 may select every third sample. If the position of the subsampling is 1, then video encoder 200 and video decoder 300 select the first HMVP candidate and then select every third sample. For instance, in the forward direction, the first sample is c1, then c4 (third sample after c1), then c7 (third sample after c4), and c10. In the backward direction, starting from c10, the result of the subsampling is {c10, c7, c4, c1}.

Subsampling is provided as one example and the techniques are not so limited. In some examples, there may be no subsampling of the HMVP candidate history table.

In another example of the disclosure, video encoder 200 and video decoder 300 may be configured to use a simplified pruning algorithm for adding HMVP candidates from the HMVP candidate history table to a motion vector predictor lists (such as merge candidate list, AMVP candidate list or affine candidate list). In one example, when adding an HMVP candidate from the HMVP candidate history table to a motion vector predictor list (e.g., merge list), video encoder 200 and video decoder 300 may be configured to prune the HMVP candidates by predefined candidates. Video encoder 200 and video decoder 300 may be configured to prune each HMVP candidate by the same predefined candidates or by different predefined candidates. The predefined candidates can be specified by the positions or types of the candidates.

For example, the number of predefined candidates is Y. When adding an HMVP candidate to a motion vector prediction list, video encoder 200 and video decoder 300 may be configured to prune the HMVP candidate using a subset of candidates of Y. For an example, in VTM and the benchmark set (BMS) software, as shown in FIGS. 4A, 4B, and 5, the set of spatial and temporal candidates are {A1, B1, B0, A0, B2, TMVP}. As described above, A1 is identified by number 0 in FIG. 4A, B1 is identified as number 1 in FIG. 4A, B0 is identified as number 2 in FIG. 4A, A0 is identified as number 3 in FIG. 4A, and B2 is identified as number 4 in FIG. 4A. The TMVP block is identified as block T 540 in FIG. 5.

A candidate HMVPi can be pruned by a comparison to a subset of Y candidates. Y can also include HMVP candidates. As an example, video encoder 200 and video decoder 300 may compare a first HMVP candidate (e.g., $HMVP_1$) to a first subset (e.g., $subet_1$) of Y candidates in the motion vector predictor list and compare a second HMVP candidate (e.g., $HMVP_2$) to the first subset of Y candidates in the motion vector predictor list. In this example, $subset_1$ may include two entries in the motion vector predictor list (e.g., Y candidates in the motion vector predictor list equals two entries in the motion vector predictor list).

As an example, Y is {A1, B1, B0, A0, B2, TMVP, HMVPi}. As another example, Y is {A1, B1, B0, A0, B2, TMVP} (e.g., the motion vector predictor list is constructed based on motion vector information of spatially and temporally neighboring blocks)

$Subset_1$ of Y is {A1 and B1} to indicate two entries in the motion vector predictor list. For instance, the motion vector information of block A1 (e.g., block 0 in FIG. 4A) and the motion vector information of block B1 (e.g., block 1 in FIG. 4A) may be two entries, and possibly the first two entries, in the motion vector predictor list.

In this example, video encoder 200 and video decoder 300 may compare the first HMVP candidate to the motion vector information of block A1 (e.g., block 0 in FIG. 4A) and the motion vector information of block B1 (e.g., block 1 in FIG. 4A). If the first HMVP candidate is different than the motion vector information of block A1 and the motion vector information of block B1, then video encoder 200 and video decoder 300 may add the first HMVP into the motion vector predictor list. If the first HMVP candidate is same as the motion vector information of either block A1 or block B1, video encoder 200 and video decoder 300 may not add the first HMVP into the motion vector predictor list.

Similarly, in this example, video encoder 200 and video decoder 300 may compare the second HMVP candidate to the motion vector information of block A1 (e.g., block 0 in FIG. 4A) and the motion vector information of block B1 (e.g., block 1 in FIG. 4A). If the second HMVP candidate is different than the motion vector information of block A1 and the motion vector information of block B1, then video encoder 200 and video decoder 300 may add the second HMVP into the motion vector predictor list. If the second HMVP candidate is same as the motion vector information of either block A1 or block B1, video encoder 200 and video decoder 300 may not add the second HMVP into the motion vector predictor list.

In the above example, the first and second HMVP candidates may be considered as being "pruned" by {A1, B1}. For instance, only if the first HMVP candidate is different than the motion vector information of A1 and B1 is the first HMVP candidate added to the motion vector predictor list, and only if the second HMVP candidate is different than the motion vector information of A1 and B1 is the second HMVP candidate added to the motion vector predictor list.

In some examples, all HMVP candidates are pruned by {A1, B1}. In another example, the HMVP candidates are pruned by {A1, B1, B0, A0}. In another example, different HMVP candidates can be pruned by different candidates. For example, in the case above, the size of the HMVP candidate history table is 10. Video encoder 200 and video decoder 300 may select one out of every 3 HMVP candidates to add in the merge list {c1, c4, c7, c10}. The candidate c1 is pruned by {A1, B1, B0}. The candidate c4 is pruned by {A1, B1}. The candidate c7 is pruned by {A1}. The candidate of c10 is not pruned. In another example, the HMVP candidates can be pruned by the other HMVP candidates.

In another example, when adding an HMVP candidate from the HMVP candidate history table to a motion vector predictor list, video encoder 200 and video decoder 300 may be configured to prune the HMVP candidates by predefined candidates in the motion vector predictor list (such as merge candidate list, AMVP candidate list or affine candidate list). For example, as described above, when adding HMVP candidates to merge list, video encoder 200 and video decoder 300 may be configured to prune the HMVP candidates by the first M candidates in the merge list. For example, M=2. When adding an HMVP candidate from the HMVP candidate history table to the merge list, video encoder 200 and video decoder 300 may be configured to prune the HMVP candidate by the first two candidates in the merge list.

Stated another way, video encoder 200 and video decoder 300 may construct a motion vector predictor list (e.g., merge list or AMVP list). Video encoder 200 and video decoder 300 may compare a first HMVP candidate in the HMVP candidate history table to two entries in the motion vector predictor list (e.g., M=2 and the two entries are the first two entries in the motion vector predictor list) and no other entries in the motion vector predictor list, and add the first HMVP candidate to the motion vector predictor list when the first HMVP candidate is different than both of the two entries in the motion vector predictor list. Video encoder 200 and video decoder 300 may compare a second HMVP candidate in the HMVP candidate history table to the two entries in the motion vector predictor list and no other entries in the motion vector predictor list, and add the second HMVP candidate to the motion vector predictor list when the second HMVP candidate is different than both of the two entries in the motion vector predictor list.

In another example, when adding an HMVP candidate to merge list, video encoder 200 and video decoder 300 may be configured to prune the HMVP candidate by specified types of candidates in the merge list. For example, video encoder 200 and video decoder 300 may be configured to prune the new HMVP candidate by the previously added spatial candidates in the merge list. As another example, video encoder 200 and video decoder 300 may be configured to prune the new HMVP candidate by the spatial candidates, and/or TMVP candidates, and/or HMVP candidates in the merge list.

As another example, when adding an HMVP candidate to the merge list, video encoder 200 and video decoder 300 may be configured to prune the HMVP candidate by a specified number of specified types candidates in the merge list. For example, video encoder 200 and video decoder 300 may be configured to prune the HMVP candidate by the first M spatial candidates in the merge list.

For another example, when adding HMVP candidates to the merge list, video encoder 200 and video decoder 300 may be configured to prune the HMVP candidates by nearest W candidates in the merge list. For example, W=2 and 4 candidates may have been added in the merge list. When adding a new HMVP candidate to merge list, video encoder 200 and video decoder 300 may be configured to prune the new HMVP candidate by the third and the fourth candidates in the merge list.

For another example, when adding HMVP candidates to AMVP list 0 (e.g., reference picture list 0), video encoder 200 and video decoder 300 may be configured to select the HMVP candidates using the same reference (same reference index, or same POC) as the current coding block. Video encoder 200 and video decoder 300 may check the HMVP candidates in forward order or backward order as described above. Video encoder 200 and video decoder 300 may be configured to prune a first number M HMVP candidates by the specified number N AMVP candidates in the list. For bidirectional prediction, AMVP list 1 can be generated in the same way as list 0. For example, in the virtual test model (VTM), the size of AMVP list is 2. If M=1 and N=1, then only the first HMVP candidate is pruned by the first AMVP candidate in the list. If M=0, no pruning is applied.

In another example, video encoder 200 and video decoder 300 may be configured to define a block (region) of size W×H. Video encoder 200 and video decoder 300 may be configured to use the same HMVP candidate history table for coding blocks inside the same W×H region.

The next section relates to merge list organization. In one example, video encoder 200 and video decoder 300 may be configured to not use HMVP candidates for pairwise average candidates generation. For an example, the predefined pairs are defined as {(0, 1), (0, 2), (1, 2), (0, 3), (1, 3), (2, 3)}, where the numbers denote the merge indices to the merge candidate list. If any of the candidates in the pair is an HMVP candidate, video encoder 200 and video decoder 300 may be configured to not use this pair to generate a pairwise candidate.

In another example, video encoder 200 and video decoder 300 may be configured to place the pairwise average candidates in front of HMVP candidates. For example, video encoder 200 and video decoder 300 may be configured to reduce the number of pairs of pairwise candidates to be N and put the N pairwise candidates in front of the HMVP candidates. For example, when N=2, video encoder 200 and video decoder 300 may only use {(0, 1), (0, 2)} to generate pairwise candidates and put them in front of HMVP candidates. As another example, when N=1, video encoder 200 and video decoder 300 may only use {(0, 1)} to generate pairwise candidates and put them in front of the HMVP candidates.

In one example, video encoder 200 and video decoder 300 may be configured to perform pruning by comparing the reference direction, and/or reference index, and/or POC, and/or motion vector (with/without scaling) between two motion vector predictors. If one or more of the comparisons match, video encoder 200 and video decoder 300 may be configured to not add this motion vector predictor to the candidate list.

In another example, the size of the HMVP table (N), the subsampling rate (R), the initial position (S), the number of HMVP tables, the selection methods, the pruning method, and/or the region size of W×H in which coding blocks share the same history table can be predefined in both video encoder 200 and video decoder 300, or be set as a value signaled from video encoder 200 to video decoder 300 at the sequence level, the picture level, the slice level, or block level. For example, such example information can be signaled in a Sequence Parameter Set (SPS), a Picture Parameter Set (PPS), a Slice header (SH), a Coding Tree Unit (CTU) or a Coding Unit (CU).

FIG. 2 is a block diagram illustrating an example video encoder 200 that may perform the techniques of this disclosure. FIG. 2 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266/VVC video coding standard in development. However, the techniques of this disclosure are not limited to these video coding standards, and are applicable generally to video encoding and decoding.

In the example of FIG. 2, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random-access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 2 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

In accordance with the techniques of this disclosure, motion estimation unit 222 and motion compensation unit 224 may perform inter-prediction and motion vector prediction techniques using an HMVP candidate history table. For example, as will be explained in more detail below, motion estimation unit 222 and motion compensation unit 224 may be configured to construct a history-based motion vector prediction (HMVP) candidate history table, add one or more HMVP candidates from the HMVP candidate history table to a motion vector predictor list, and code a block of video data using the motion vector predictor list.

For example, motion estimation unit 222 and motion compensation unit 224 may be configured to construct a history-based motion vector prediction (HMVP) candidate history table that includes motion vector information of previously coded blocks that extend beyond adjacent neighboring blocks of a current block. For instance, the HMVP candidate history table includes HMVP candidates, such as motion vector information of blocks that are not immediately adjacent to the current block. The current block may be encoded in a merge mode but other modes like AMVP and or intra block copy (IBC) mode are possible.

Motion estimation unit 222 and motion compensation unit 224 may also construct a motion vector predictor list. The motion vector predictor list includes motion vector information of spatially neighboring blocks or collocated blocks (e.g., temporally neighboring blocks). As one example, the motion vector predictor list may include motion vector information of one or more of spatially neighboring blocks A1, B1, B0, A0, and B2, where, in FIG. 4A, block A1 is identified as 0 and is left of PU0 434, block B1 is identified as 1 and is above of PU0 434, block B0 is identified as 2 and is above right of PU0 434 and above PU1 436, block A0 is identified as 3 and is below left of PU0 434, and block B2 is identified as 4 and is above left of PU0 434. The motion vector predictor list may also include motion vector information of temporally neighboring block T 540.

Motion estimation unit 222 and motion compensation unit 224 may add one or more HMVP candidates from the HMVP candidate history table to the motion vector predictor list. For example, to add the one or more HMVP candidates from the HMVP candidate history table, motion estimation unit 222 and motion compensation unit 224 may be configured to compare a first HMVP candidate in the HMVP candidate history table to two entries in the motion vector predictor list and no other entries in the motion vector predictor list, and add the first HMVP candidate to the motion vector predictor list when the first HMVP candidate is different than both of the two entries in the motion vector predictor list. Motion estimation unit 222 and motion compensation unit 224 may be also configured to compare a second HMVP candidate in the HMVP candidate history table to the two entries in the motion vector predictor list and no other entries in the motion vector predictor list, and add the second HMVP candidate to the motion vector predictor list when the second HMVP candidate is different than both of the two entries in the motion vector predictor list.

In some examples, a first entry of the two entries in the motion vector predictor list may include the motion vector information of the left neighboring block (e.g., block A1 represented as 0 in FIG. 4A). A second entry of the two entries in the motion vector predictor list may include the motion vector information of the above neighboring block (e.g., block B1 represented as 1 in FIG. 4A). The first entry and the second entry in the motion vector predictor list may be the first two entries in the motion vector predictor list but the techniques are not so limited. Also, the first HMVP and the second HMVP candidates may be the first two candidates in the HMVP candidate history table.

In some examples, even after motion estimation unit 222 and motion compensation unit 224 include one or both of the first and second HMVP candidates into the motion vector predictor list, the size of the motion vector predictor list may not have reached its maximum size. In such cases, the first and second HMVP candidates may be considered as an example of a first subset of HMVP candidates, although more HMVP candidates may be included in the first subset of HMVP candidates. Motion estimation unit 222 and motion compensation unit 224 may add one or more HMVP candidates from a second subset of one or more HMVP candidates that follow the first subset of one or more HMVP candidates in the HMVP candidate history table to the motion vector predictor list without comparing the one or more HMVP candidates from the second subset with entries in the motion vector predictor list.

Motion estimation unit 222 and motion compensation unit 224 may be configured to determine a motion vector for the current block used for identifying a prediction block. Motion estimation unit 222 and motion compensation unit 224 may determine an entry into the motion vector predictor list based on the determined motion vector for the current block. For example, for merge mode, motion estimation unit 222 and motion compensation unit 224 may determine an entry in the motion vector predictor list that has the same motion vector information as the motion vector information of the determined motion vector. For AMVP mode, motion estimation unit 222 and motion compensation unit 224 may determine an entry in the motion vector predictor list that has motion vector information similar to the motion vector information of the determined motion vector. Motion estimation unit 222 and motion compensation unit 224 may also determine a motion vector difference (MVD) between the motion vector information of the entry and the determined motion vector for the current block.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

As illustrated, in some examples, entropy encoding unit 220 may receive information from mode selection unit 202. As one example, motion estimation unit 222 and motion compensation unit 224 may be configured to output information indicative of the entry into the motion vector predictor list (e.g., as constructed using the example techniques described above). Entropy encoding unit 220 may encode and signal the information indicative of the entry into the motion vector predictor list. Entropy encoding unit 220 may also encode and signal information indicative of a difference between the prediction block, identified by the motion vector for the current block, and the current block.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding blocks and the chroma coding blocks.

FIG. 3 is a block diagram illustrating an example video decoder 300 that may perform the techniques of this disclosure. FIG. 3 is provided for purposes of explanation and is not limiting on the techniques as broadly exemplified and described in this disclosure. For purposes of explanation, this disclosure describes video decoder 300 according to the techniques of H.266/VVC, JEM, and HEVC. However, the techniques of this disclosure may be performed by video coding devices that are configured to other video coding standards.

In the example of FIG. 3, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Prediction processing unit 304 includes motion compensation unit 316 and intra-prediction unit 318. Prediction processing unit 304 may include addition units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random-access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 3 are illustrated to assist with understanding the operations performed by video decoder 300. The units may be implemented as fixed-function circuits, programmable circuits, or a combination thereof. Similar to FIG. 2, fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 2).

In accordance with the techniques of this disclosure, motion compensation unit 316 may perform inter-prediction and motion vector prediction techniques when coding a block using an HMVP candidate history table. For example, as will be explained in more detail below, motion compensation unit 316 may be configured to construct a history-based motion vector prediction (HMVP) candidate history table, add one or more HMVP candidates from the HMVP candidate history table to a motion vector predictor list, and code a block of video data using the motion vector predictor list.

For example, motion compensation unit 316 may be configured to construct a history-based motion vector prediction (HMVP) candidate history table that includes motion vector information of previously coded blocks that extend beyond adjacent neighboring blocks of a current block. For instance, the HMVP candidate history table includes HMVP candidates, such as motion vector information of blocks that are not immediately adjacent to the current block. As described below, the current block may be encoded in a merge mode but other modes like AMVP and or intra block copy (IBC) mode are also possible.

Motion compensation unit 316 may also construct a motion vector predictor list. The motion vector predictor list includes motion vector information of spatially neighboring blocks or collocated blocks (e.g., temporally neighboring blocks). As one example, the motion vector predictor list may include motion vector information of one or more of spatially neighboring blocks A1, B1, B0, A0, and B2, where, in FIG. 4A, block A1 is identified as 0 and is left of PU0 434, block B1 is identified as 1 and is above of PU0 434, block B0 is identified as 2 and is above right of PU0 434 and above PU1 436, block A0 is identified as 3 and is below left of PU0 434, and block B2 is identified as 4 and is above left of PU0 434. The motion vector predictor list may also include motion vector information of temporally neighboring block T 540.

Motion compensation unit 316 may add one or more HMVP candidates from the HMVP candidate history table to the motion vector predictor list. For example, to add the one or more HMVP candidates from the HMVP candidate history table, motion compensation unit 316 may be configured to compare a first HMVP candidate in the HMVP candidate history table to two entries in the motion vector predictor list and no other entries in the motion vector predictor list, and add the first HMVP candidate to the motion vector predictor list when the first HMVP candidate is different than both of the two entries in the motion vector predictor list. Motion compensation unit 316 may be also configured to compare a second HMVP candidate in the HMVP candidate history table to the two entries in the motion vector predictor list and no other entries in the motion vector predictor list, and add the second HMVP candidate to the motion vector predictor list when the second HMVP candidate is different than both of the two entries in the motion vector predictor list.

In some examples, a first entry of the two entries in the motion vector predictor list may include the motion vector information of the left neighboring block (e.g., block A1 represented as 0 in FIG. 4A). A second entry of the two entries in the motion vector predictor list may include the motion vector information of the above neighboring block (e.g., block B1 represented as 1 in FIG. 4A). The first entry and the second entry in the motion vector predictor list may be the first two entries in the motion vector predictor list but the techniques are not so limited. Also, the first HMVP and the second HMVP candidates may be the first two candidates in the HMVP candidate history table.

In some examples, even after motion compensation unit 316 includes one or both of the first and second HMVP candidates into the motion vector predictor list, the size of the motion vector predictor list may not have reached its maximum size. In such cases, the first and second HMVP candidates may be considered as an example of a first subset of HMVP candidates, although more HMVP candidates may be included in the first subset of HMVP candidates.

Motion compensation unit 316 may add one or more HMVP candidates from a second subset of one or more HMVP candidates that follow the first subset of one or more HMVP candidates in the HMVP candidate history table to the motion vector predictor list without comparing the one or more HMVP candidates from the second subset with entries in the motion vector predictor list.

In some examples, entropy decoding unit 302 may decode information indicative of an entry into the motion vector predictor list. Motion compensation unit 316 may receive information indicative of the entry into the motion vector predictor list and retrieve the motion vector information from the entry of the motion vector predictor list.

Motion compensation unit 316 may determine the motion vector for the current block based on the retrieved motion vector information. For example, in merge mode, motion compensation unit 316 may set the motion vector for the current block equal to the retrieved motion vector information. In AMVP mode, motion compensation unit 316 may also receive a motion vector difference (MVD) between the retrieved motion vector information and the actual motion vector. Motion compensation unit 316 may add the MVD to the retrieved motion vector information to determine the motion vector for the current block.

Motion compensation unit 316 may determine a prediction block for the current block based on the motion vector for the current block. For example, motion compensation unit 316 may retrieve sample values from a reference picture that includes a reference block that is identified by the motion vector. Motion compensation unit 316 may determine the prediction block based on the retrieved samples.

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 2). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block. In other words, reconstruction unit 310 may add the prediction block to received residual information indicative of a difference between the prediction block and the current block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB for subsequent presentation on a display device, such as display device 118 of FIG. 1.

In this manner, video decoder 300 represents an example of a video decoding device including a memory configured to store video data, and one or more processing units implemented in circuitry and configured to construct a history-based motion vector prediction (HMVP) candidate history table, add one or more HMVP candidates from the HMVP candidate history table to a motion vector predictor list, and code a block of video data using the motion vector predictor list.

Figure 7:
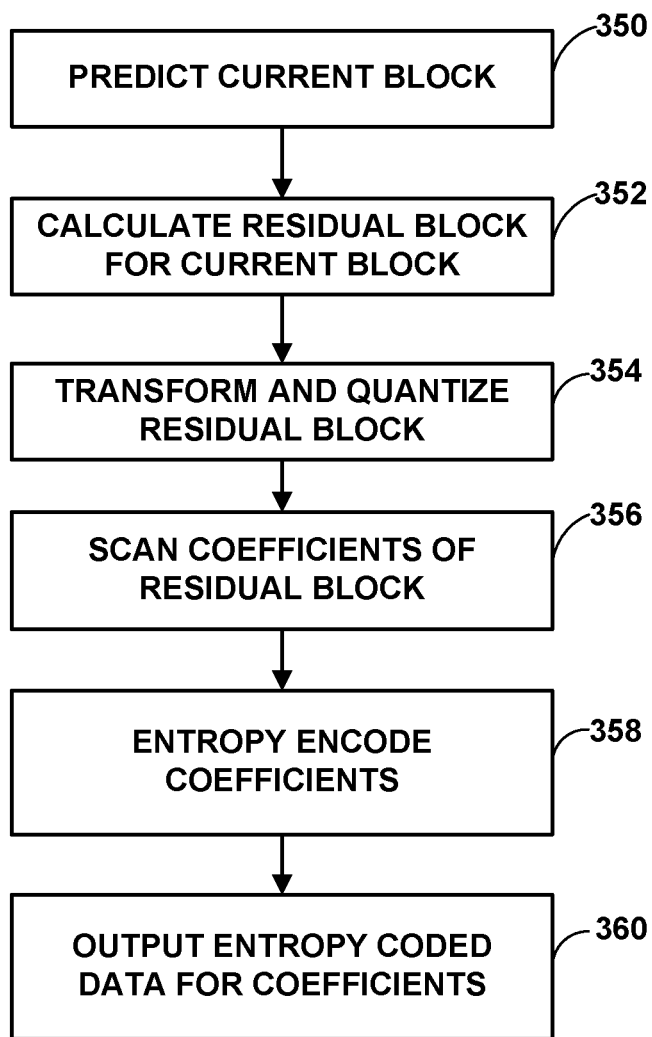
FIG. 7 is a flowchart illustrating an example encoding method.

FIG. 7 is a flowchart illustrating an example method for encoding a current block. The current block may comprise a current CU. Although described with respect to video encoder 200 (FIGS. 1 and 2), it should be understood that other devices may be configured to perform a method similar to that of FIG. 7.

In this example, video encoder 200 initially predicts the current block (350). For example, video encoder 200 may form a prediction block for the current block. In one or more examples, video encoder 200 may be configured to form the prediction block based on a motion vector. Video encoder 200 may be configured to construct a motion vector predictor list utilizing the example techniques described in this disclosure and signal information for an entry in the motion vector predictor list that video decoder 300 utilizes to determine the motion vector.

Video encoder 200 may then calculate a residual block for the current block (352). To calculate the residual block, video encoder 200 may calculate a difference between the original, uncoded block and the prediction block for the current block. Video encoder 200 may then transform and quantize coefficients of the residual block (354). Next, video encoder 200 may scan the quantized transform coefficients of the residual block (356). During the scan, or following the scan, video encoder 200 may entropy encode the coefficients (358). For example, video encoder 200 may encode the coefficients using CAVLC or CABAC. Video encoder 200 may then output the entropy coded data of the block (360).

Figure 8:
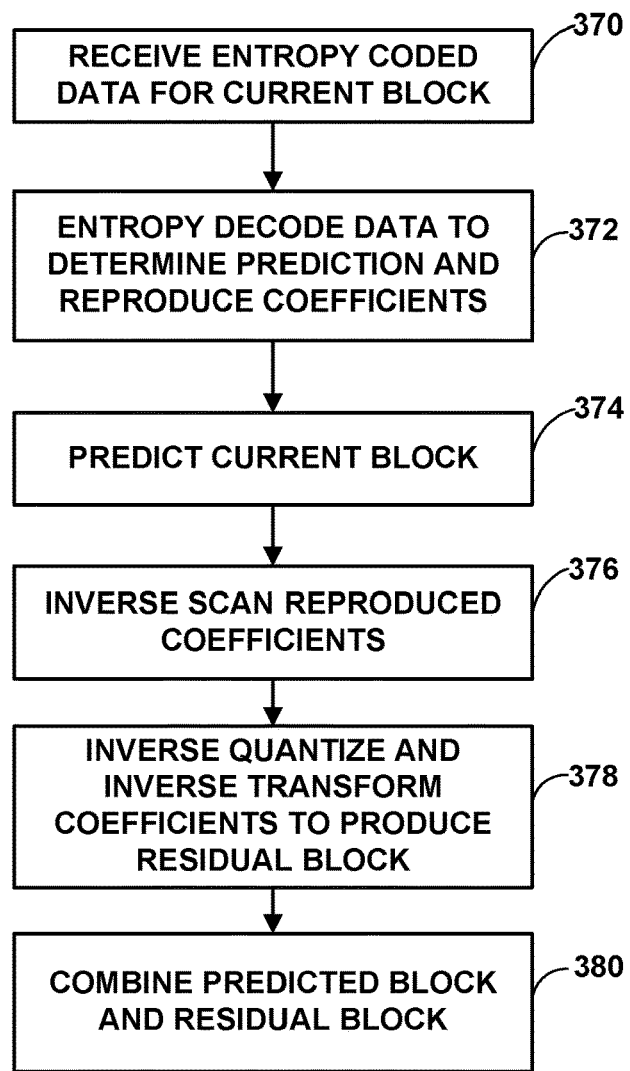
FIG. 8 is a flowchart illustrating an example decoding method.

FIG. 8 is a flowchart illustrating an example method for decoding a current block of video data. The current block may comprise a current CU. Although described with respect to video decoder 300 (FIGS. 1 and 3), it should be understood that other devices may be configured to perform a method similar to that of FIG. 8.

Video decoder 300 may receive entropy coded data for the current block, such as entropy coded prediction information and entropy coded data for coefficients of a residual block corresponding to the current block (370). Video decoder 300 may entropy decode the entropy coded data to determine prediction information for the current block and to reproduce coefficients of the residual block (372). Video decoder 300 may predict the current block (374), e.g., using an intra- or inter-prediction mode as indicated by the prediction information for the current block, to calculate a prediction block for the current block.

As one example, video decoder 300 may be configured to construct a motion vector predictor list using the example techniques described in this disclosure. Video decoder 300 may then receive an entry into the motion vector predictor list and may determine the motion vector for the current block based on the motion vector information in the entry of the motion vector predictor list. Video decoder 300 may then calculate a prediction block based on the determined motion vector.

Video decoder 300 may then inverse scan the reproduced coefficients (376), to create a block of quantized transform coefficients. Video decoder 300 may then inverse quantize and inverse transform the coefficients to produce a residual block (378). Video decoder 300 may ultimately decode the current block by combining the prediction block and the residual block (380).

Figure 9:
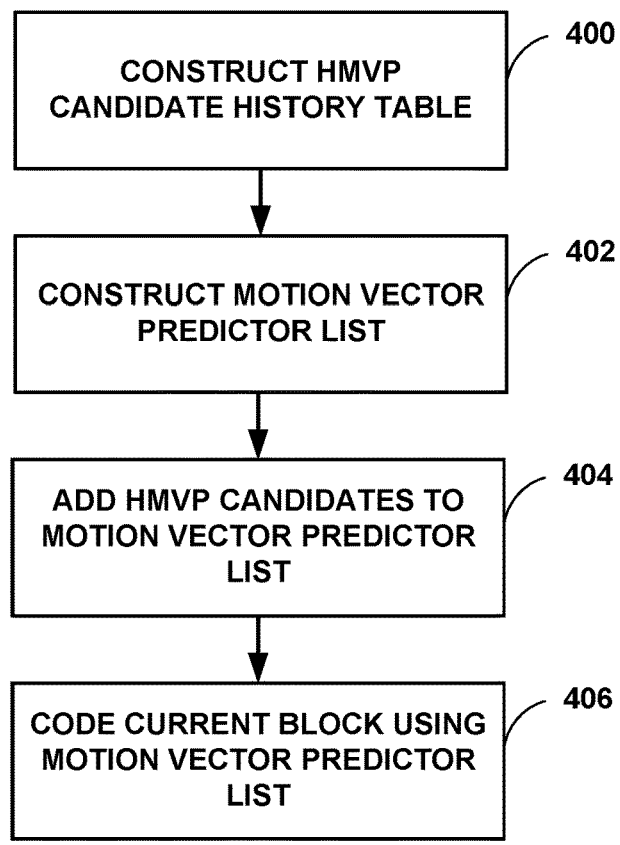
FIG. 9 is a flowchart illustrating an example coding method.

FIG. 9 is a flowchart illustrating an example coding method. For ease of description, the example of FIG. 9 is described with respect to processing circuitry. Examples of the processing circuitry includes fixed-function and/or programmable processing circuitry that form video encoder 200 or video decoder 300. For instance, both video encoder 200 and video decoder 300 may be configured to perform the example techniques described in this disclosure.

The processing circuitry may be configured to construct a history-based motion vector prediction (HMVP) candidate history table that includes motion vector information of previously coded blocks that extend beyond adjacent neighboring blocks of a current block (400). For example, the processing circuitry may access memory (e.g., video data memory 230 or DPB 314) for motion vector information of previously coded blocks that do not immediately neighbor the current block. The processing circuitry may add the motion vector information of these previously coded blocks into the HMVP candidate history table.

The processing circuitry may construct a motion vector predictor list (402). The processing circuitry may construct the motion vector predictor list with motion information of one or more spatially neighboring blocks or collocated blocks (e.g., temporally neighboring blocks). For example, the processing circuitry may add motion vector information of spatially neighboring blocks or collocated blocks into the motion vector predictor list to construct the motion vector predictor list.

In techniques described in this disclosure, the processing circuitry may further add one or more one or more HMVP candidates from the HMVP candidate history table to the motion vector predictor list for the current block (404). The processing circuitry may add the one or more HMVP candidates for the current block that is coded in a merge mode, and generally, the processing circuitry may add the one or more HMVP for the current block that is coded in one of a merge mode, an advanced motion vector prediction (AMVP) mode, or an intra block copy (IBC) merge mode.

To add the one or more HMVP candidates from the HMVP candidate history table, the processing circuitry may be configured to compare a first HMVP candidate in the HMVP candidate history table to two entries in the motion vector predictor list and no other entries in the motion vector predictor list, and add the first HMVP candidate to the motion vector predictor list when the first HMVP candidate is different than both of the two entries in the motion vector predictor list. Also, the processing circuitry may be configured to compare a second HMVP candidate in the HMVP candidate history table to the two entries in the motion vector predictor list and no other entries in the motion vector predictor list, and add the second HMVP candidate to the motion vector predictor list when the second HMVP candidate is different than both of the two entries in the motion vector predictor list. In some examples, the two entries in the motion vector predictor list may be a first entry for a left neighboring block of the current block and a second entry for an above neighboring block of the current block.

In some examples, the first and second HMVP candidates may be considered as a first subset of HMVP candidates. However, there may be more than two HMVP candidates in the first subset of candidates. The processing circuitry may be further configured to add one or more HMVP candidates from a second subset of one or more HMVP candidates that follow the first subset of one or more HMVP candidates in the HMVP candidate history table to the motion vector predictor list without comparing the one or more HMVP candidates from the second subset with entries in the motion vector predictor list.

The processing circuitry may be configured to code the current block of video data using the motion vector predictor list (406). As one example, where processing circuitry represents video decoder 300, the processing circuitry may be configured to retrieve motion vector information from an entry of the motion vector predictor list, determine a motion vector for the current block based on the retrieved motion vector information, determine a prediction block based on the motion vector, and add the prediction block to received residual information indicative of a difference between the prediction block and the current block to reconstruct the current block. As another example, where processing circuitry represents video encoder 200, the processing circuitry may be configured to determine a motion vector for the current block used for identifying a prediction block, signal information indicative of an entry into the motion vector predictor list based on the determined motion vector for the current block, and signal residual information indicative of a difference between the prediction block and the current block.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
constructing a history-based motion vector prediction (HMVP) candidate history table that includes motion vector information of previously coded blocks that extend beyond adjacent neighboring blocks of a current block of the video data;
constructing a motion vector predictor list;
adding a first subset of one or more HMVP candidates from the HMVP candidate history table to the motion vector predictor list, wherein adding the first subset of one or more HMVP candidates from the HMVP candidate history table comprises:
comparing a first HMVP candidate from the first subset in the HMVP candidate history table to two entries in the motion vector predictor list and no other entries in the motion vector predictor list, wherein the two entries in the motion vector predictor list comprise an entry for a left neighboring block of the current block and an entry for an above neighboring block of the current block; and
adding the first HMVP candidate to the motion vector predictor list when the first HMVP candidate is different than both of the two entries in the motion vector predictor list;
adding one or more HMVP candidates from a second subset of one or more HMVP candidates that follow the first subset of one or more HMVP candidates in the HMVP candidate history table to the motion vector predictor list without comparing the one or more HMVP candidates from the second subset with entries in the motion vector predictor list; and
coding the current block of video data using the motion vector predictor list.

2. The method of claim 1, wherein adding the first subset of one or more HMVP candidates further comprises:
comparing a second HMVP candidate from the first subset in the HMVP candidate history table to the two entries in the motion vector predictor list and no other entries in the motion vector predictor list; and
adding the second HMVP candidate to the motion vector predictor list when the second HMVP candidate is different than both of the two entries in the motion vector predictor list.

3. The method of claim 1, wherein the adding the first subset of the one or more HMVP candidates comprises adding the first subset of the one or more HMVP candidates for the current block that is coded in one of a merge mode, an advanced motion vector prediction (AMVP) mode, or an intra block copy (IBC) merge mode.

4. The method of claim 1, wherein constructing the motion vector predictor list comprises constructing the motion vector predictor list with motion information of one or more spatially neighboring blocks or collocated blocks.

5. The method of claim 1, wherein coding the current block comprises decoding the current block, and wherein decoding the current block comprises:
retrieving motion vector information from an entry of the motion vector predictor list;
determining a motion vector for the current block based on the retrieved motion vector information;
determining a prediction block based on the motion vector; and
adding the prediction block to received residual information indicative of a difference between the prediction block and the current block to reconstruct the current block.

6. The method of claim 1, wherein coding the current block comprises encoding the current block, and wherein encoding the current block comprises:
determining a motion vector for the current block used for identifying a prediction block;
signaling information indicative of an entry into the motion vector predictor list based on the determined motion vector for the current block; and
signaling residual information indicative of a difference between the prediction block and the current block.

7. A device for coding video data, the device comprising:
memory configured to store:
a history-based motion vector prediction (HMVP) candidate history table that includes motion vector information of previously coded blocks that extend beyond adjacent neighboring blocks of a current block of the video data, and
a motion vector predictor list; and
processing circuitry configured to:
construct the HMVP candidate history table for storage in the memory;
construct the motion vector predictor list for storage in the memory;
add a first subset of one or more HMVP candidates from the HMVP candidate history table to the motion vector predictor list, wherein to add the first subset of one or more HMVP candidates from the HMVP candidate history table, the processing circuitry is configured to:
compare a first HMVP candidate from the first subset in the HMVP candidate history table to two entries in the motion vector predictor list and no other entries in the motion vector predictor list, wherein the two entries in the motion vector predictor list comprise an entry for a left neighboring block of the current block and an entry for an above neighboring block of the current block; and
add the first HMVP candidate to the motion vector predictor list when the first HMVP candidate is different than both of the two entries in the motion vector predictor list;
add one or more HMVP candidates from a second subset of one or more HMVP candidates that follow the first subset of one or more HMVP candidates in the HMVP candidate history table to the motion vector predictor list without comparing the one or more HMVP candidates from the second subset with entries in the motion vector predictor list; and
code the current block of video data using the motion vector predictor list stored in the memory.

8. The device of claim 7, wherein to add the first subset of one or more HMVP candidates, the processing circuitry is configured to:
compare a second HMVP candidate from the first subset in the HMVP candidate history table to the two entries in the motion vector predictor list and no other entries in the motion vector predictor list; and
add the second HMVP candidate to the motion vector predictor list when the second HMVP candidate is different than both of the two entries in the motion vector predictor list.

9. The device of claim 7, wherein to add the first subset of the one or more HMVP candidates, the processing circuitry is configured to add the first subset of the one or more HMVP candidates for the current block that is coded in one of a merge mode, an advanced motion vector prediction (AMVP) mode, or an intra block copy (IBC) merge mode.

10. The device of claim 7, wherein to construct the motion vector predictor list, the processing circuitry is configured to construct the motion vector predictor list with motion information of one or more spatially neighboring blocks or collocated blocks.

11. The device of claim 7, wherein to code the current block, the processing circuitry is configured to decode the current block, and wherein to decode the current block, the processing circuitry is configured to:
retrieve motion vector information from an entry of the motion vector predictor list;

determine a motion vector for the current block based on the retrieved motion vector information;

determine a prediction block based on the motion vector; and add the prediction block to received residual information indicative of a difference between the prediction block and the current block to reconstruct the current block.

12. The device of claim 7, wherein to code the current block, the processing circuitry is configured to encode the current block, and wherein to encode the current block, the processing circuitry is configured to:

determine a motion vector for the current block used for identifying a prediction block;

signal information indicative of an entry into the motion vector predictor list based on the determined motion vector for the current block; and signal residual information indicative of a difference between the prediction block and the current block.

13. The device of claim 7, wherein the device is a wireless communication device.

14. A non-transitory computer-readable storage medium storing instructions thereon that when executed cause one or more processors to:

construct a history-based motion vector prediction (HMVP) candidate history table that includes motion vector information of previously coded blocks that extend beyond adjacent neighboring blocks of a current block of the video data;

construct a motion vector predictor list;

add a first subset of one or more HMVP candidates from the HMVP candidate history table to the motion vector predictor list, wherein the instructions that cause the one or more processors to add the first subset of one or more HMVP candidates from the HMVP candidate history table comprise instructions that cause the one or more processors to:

compare a first HMVP candidate from the first subset in the HMVP candidate history table to two entries in the motion vector predictor list and no other entries in the motion vector predictor list, wherein the two entries in the motion vector predictor list comprise an entry for a left neighboring block of the current block and an entry for an above neighboring block of the current block; and add the first HMVP candidate to the motion vector predictor list when the first HMVP candidate is different than both of the two entries in the motion vector predictor list;

add one or more HMVP candidates from a second subset of one or more HMVP candidates that follow the first subset of one or more HMVP candidates in the HMVP candidate history table to the motion vector predictor list without comparing the one or more HMVP candidates from the second subset with entries in the motion vector predictor list; and code the current block of video data using the motion vector predictor list.

15. The computer-readable storage medium of claim 14, wherein the instructions that cause the one or more processors to add the first subset of one or more HMVP candidates comprise instructions that cause the one or more processors to:

compare a second HMVP candidate from the first subset in the HMVP candidate history table to the two entries in the motion vector predictor list and no other entries in the motion vector predictor list; and add the second HMVP candidate to the motion vector predictor list when the second HMVP candidate is different than both of the two entries in the motion vector predictor list.

16. The computer-readable storage medium of claim 14, wherein the instructions that cause the one or more processors to add the first subset of the one or more HMVP candidates comprise instructions that cause the one or more processors to add the first subset of the one or more HMVP candidates for the current block that is coded in one of a merge mode, an advanced motion vector prediction (AMVP) mode, or an intra block copy (IBC) merge mode.

17. The computer-readable storage medium of claim 14, wherein the instructions that cause the one or more processors to construct the motion vector predictor list comprise instructions that cause the one or more processors to construct the motion vector predictor list with motion information of one or more spatially neighboring blocks or collocated blocks.

18. The computer-readable storage medium of claim 14, wherein the instructions that cause the one or more processors to code the current block comprise instructions that cause the one or more processors to decode the current block, and wherein the instructions that cause the one or more processors to decode the current block comprise instructions that cause the one or more processors to:

retrieve motion vector information from an entry of the motion vector predictor list;

determine a motion vector for the current block based on the retrieved motion vector information;

determine a prediction block based on the motion vector; and add the prediction block to received residual information indicative of a difference between the prediction block and the current block to reconstruct the current block.

19. The computer-readable storage medium of claim 14, wherein the instructions that cause the one or more processors to code the current block comprise instructions that cause the one or more processors to encode the current block, and wherein the instructions that cause the one or more processors to encode the current block comprise instructions that cause the one or more processors to:

determine a motion vector for the current block used for identifying a prediction block;

signal information indicative of an entry into the motion vector predictor list based on the determined motion vector for the current block; and signal residual information indicative of a difference between the prediction block and the current block.

* * * * *